United States Patent
Farewell et al.

(10) Patent No.: US 9,447,850 B2
(45) Date of Patent: Sep. 20, 2016

(54) ADJUSTABLE TENSIONER

(71) Applicant: LITENS AUTOMOTIVE PARTNERSHIP, Woodbridge (CA)

(72) Inventors: Ron Farewell, Mississauga (CA); Zbyslaw Staniewicz, Mississauga (CA); Andrew M. Boyes, Aurora (CA)

(73) Assignee: Litens Automotive Partnership, Woodbridge, ON (CA)

( * ) Notice: Subject to any disclaimer, the term of this patent is extended or adjusted under 35 U.S.C. 154(b) by 147 days.

(21) Appl. No.: 14/397,577

(22) PCT Filed: Mar. 15, 2013

(86) PCT No.: PCT/CA2013/000258
§ 371 (c)(1),
(2) Date: Oct. 28, 2014

(87) PCT Pub. No.: WO2013/159181
PCT Pub. Date: Oct. 31, 2013

(65) Prior Publication Data
US 2015/0126315 A1    May 7, 2015

Related U.S. Application Data

(60) Provisional application No. 61/639,859, filed on Apr. 28, 2012, provisional application No. 61/759,392, filed on Jan. 31, 2013.

(51) Int. Cl.
*F16H 7/12* (2006.01)
*F16H 7/22* (2006.01)
(Continued)

(52) U.S. Cl.
CPC ............. *F16H 7/1281* (2013.01); *B60K 25/02* (2013.01); *F02B 67/06* (2013.01); *F16H 7/1236* (2013.01);
(Continued)

(58) Field of Classification Search
CPC ................. F02B 67/06; F16H 7/1281; F16H 2007/081; F16H 2007/0806; F16H 2007/0861
USPC ................. 474/135, 110, 109, 112, 103, 102
See application file for complete search history.

(56) References Cited

U.S. PATENT DOCUMENTS 3,954,016 A * 5/1976 Sarosy ............. E05B 81/25
74/29
4,131,306 A * 12/1978 Sokoly ............. E05B 77/48
292/201

(Continued)

FOREIGN PATENT DOCUMENTS

CA    2469497 A1    6/2003
CA    2508352 A1    7/2004
(Continued)

OTHER PUBLICATIONS

MTS Temposonics Commercial Sensors, 2000, MTS Systems Corporation.
(Continued)

*Primary Examiner* — Henry Liu
(74) *Attorney, Agent, or Firm* — Millman IP Inc.

(57) ABSTRACT

A tensioner for an engine accessory drive system includes a tensioner arm pivotally mounted for movement between a free arm position and a load stop position. The tensioner arm includes a pulley which engages a belt. A piston, disposed in a cylinder, is pivotally linked to the tensioner arm. A spring urges the tensioner arm towards the free arm position. A moveable load stop member, controlled by an actuator, projects into the cylinder. The load stop member abuts the piston to thereby arrest movement of the tensioner arm and define the load stop position. The actuator may drive the load stop member against the piston to move the tensioner arm towards the free arm position so as to increase belt tension.

13 Claims, 20 Drawing Sheets

(51) Int. Cl.
*F16H 7/10* (2006.01)
*F02B 67/06* (2006.01)
*B60K 25/02* (2006.01)
*F16H 7/08* (2006.01)

(52) U.S. Cl.
CPC .............. *F16H 2007/0806* (2013.01); *F16H 2007/0823* (2013.01); *F16H 2007/0846* (2013.01); *F16H 2007/0861* (2013.01); *F16H 2007/0885* (2013.01); *F16H 2007/0893* (2013.01)

(56) References Cited

U.S. PATENT DOCUMENTS

| | | | | |
|---|---|---|---|---|
| 4,263,578 A * | 4/1981 | Fukuhara | G01P 1/103 | 307/123 |
| 4,355,991 A * | 10/1982 | Kraft | F02B 67/06 | 474/110 |
| 4,406,550 A * | 9/1983 | Gray | G01K 1/026 | 374/110 |
| 4,473,362 A * | 9/1984 | Thomey | F02B 67/06 | 267/136 |
| 4,478,595 A * | 10/1984 | Hayakawa | F02B 77/081 | 474/109 |
| 4,533,341 A * | 8/1985 | Yokota | F16H 7/0848 | 474/109 |
| 4,573,952 A * | 3/1986 | Schulze | F16H 7/1254 | 474/110 |
| 4,573,957 A * | 3/1986 | Billberg | B31B 1/78 | 493/309 |
| 4,575,367 A * | 3/1986 | Karmel | G01P 3/60 | 474/106 |
| 4,648,357 A * | 3/1987 | Hayashi | F01P 11/02 | 123/41.27 |
| 4,674,781 A * | 6/1987 | Reece | E05B 81/25 | 292/201 |
| 4,702,727 A * | 10/1987 | Dahm | F16H 7/1218 | 474/101 |
| 4,728,260 A * | 3/1988 | Ishii | B60S 1/481 | 137/118.06 |
| 4,731,044 A * | 3/1988 | Mott | F16H 61/66272 | 474/101 |
| 4,802,883 A * | 2/1989 | Tominaga | F01L 1/02 | 474/101 |
| 4,850,466 A * | 7/1989 | Rogakos | E05B 81/25 | 192/105 BA |
| 4,878,461 A * | 11/1989 | Sapienza, IV | F01L 1/02 | 123/90.15 |
| 4,883,446 A * | 11/1989 | Mitchell | F02B 67/06 | 474/133 |
| 4,885,954 A * | 12/1989 | Wanlass | E05B 81/25 | 250/227.12 |
| 4,893,704 A * | 1/1990 | Fry | E05B 81/25 | 192/141 |
| 4,977,743 A * | 12/1990 | Aihara | F01P 7/048 | 123/41.31 |
| 5,011,458 A * | 4/1991 | Kumm | F16H 9/10 | 474/49 |
| 5,159,904 A * | 11/1992 | Ingold | F01L 1/348 | 123/90.15 |
| 5,338,076 A * | 8/1994 | Tanaka | E05B 81/25 | 292/201 |
| 5,439,420 A * | 8/1995 | Meckstroth | F02B 67/06 | 474/133 |
| 5,482,406 A * | 1/1996 | Arlt, III | E21B 19/006 | 166/167 |
| 5,634,676 A * | 6/1997 | Feder | E05B 81/25 | 292/144 |
| 5,733,214 A * | 3/1998 | Shiki | F01L 1/02 | 474/110 |
| 5,752,891 A * | 5/1998 | Meckstroth | F02B 67/06 | 474/110 |
| 5,862,903 A * | 1/1999 | Gruden | E05B 81/25 | 192/105 BB |
| 5,873,799 A * | 2/1999 | Meckstroth | F16H 7/1281 | 474/101 |
| 5,983,739 A * | 11/1999 | Feder | E05B 81/25 | 70/280 |
| 6,067,826 A * | 5/2000 | Holloway | E05B 81/25 | 292/201 |
| 6,216,547 B1 * | 4/2001 | Lehtovaara | G01L 1/2237 | 73/862.391 |
| 6,264,478 B1 * | 7/2001 | Davison | H05K 7/1007 | 439/70 |
| 6,264,578 B1 | 7/2001 | Ayukawa | | |
| 6,374,608 B1 * | 4/2002 | Corris | F03G 7/065 | 60/527 |
| 6,375,588 B1 * | 4/2002 | Frankowski | F16H 7/1227 | 474/101 |
| 6,422,962 B1 * | 7/2002 | Lehtovaara | F16H 7/1236 | 474/101 |
| 6,478,701 B1 * | 11/2002 | Yasuhara | F16H 7/12 | 305/147 |
| 6,484,593 B2 * | 11/2002 | Lehtovaara | G01L 1/2237 | 73/862.637 |
| 6,547,692 B1 * | 4/2003 | Ries-Mueller | B60W 10/06 | 477/45 |
| 6,609,985 B2 * | 8/2003 | Todd | F16H 7/0829 | 474/103 |
| 6,629,512 B2 * | 10/2003 | Iwatani | F01M 5/021 | 123/142.5 R |
| 6,666,784 B1 * | 12/2003 | Iwamoto | F01L 1/024 | 137/554 |
| 6,746,352 B1 * | 6/2004 | Poiret | F01L 1/02 | 474/101 |
| 6,758,172 B2 * | 7/2004 | Morgan | F01P 7/048 | 123/41.08 |
| 6,821,223 B2 * | 11/2004 | Henry | F01L 1/34 | 474/109 |
| 6,834,228 B2 * | 12/2004 | Serkh | F02B 67/06 | 123/195 A |
| 6,855,141 B2 * | 2/2005 | Lovewell | A61B 18/1206 | 606/34 |
| 6,913,068 B2 * | 7/2005 | Togawa | F02G 5/02 | 123/196 AB |
| 6,953,407 B2 * | 10/2005 | Kitamura | F02B 67/06 | 474/109 |
| 6,955,141 B2 * | 10/2005 | Santanam | F01P 7/165 | 123/41.08 |
| 7,081,059 B2 * | 7/2006 | Iwamoto | F01L 1/024 | 137/554 |
| 7,086,373 B2 * | 8/2006 | Serkh | F01L 1/024 | 123/195 A |
| 7,163,478 B2 * | 1/2007 | Oliver | F16H 7/1281 | 474/133 |
| 7,188,021 B2 * | 3/2007 | Spicer | F02D 41/009 | 701/103 |
| 7,217,206 B2 * | 5/2007 | Stone | F01L 1/024 | 474/110 |
| 7,217,207 B1 * | 5/2007 | Hallen | F16H 7/129 | 474/101 |
| 7,226,377 B2 * | 6/2007 | Kraus | F16H 7/1209 | 474/117 |
| 7,591,357 B2 * | 9/2009 | Antchak | F16D 41/206 | 192/41 S |
| 7,618,337 B2 * | 11/2009 | Jansen | F02B 67/06 | 192/41 S |
| 7,624,852 B2 * | 12/2009 | Mevissen | F16D 7/022 | 192/41 S |
| 7,699,732 B2 * | 4/2010 | Message | F16H 7/1281 | 474/106 |
| 7,771,302 B2 * | 8/2010 | Pendergrass | F16H 7/1281 | 474/109 |
| 8,166,945 B2 * | 5/2012 | Spicer | F02N 15/022 | 123/179.25 |
| 2002/0128099 A1 * | 9/2002 | Winklhofer | F01L 1/02 | 474/102 |
| 2003/0083803 A1 * | 5/2003 | Serkh | F02B 67/06 | 701/115 |
| 2003/0199350 A1 * | 10/2003 | Henry | F01L 1/34 | 474/138 |
| 2005/0029991 A1 * | 2/2005 | Albertson | F02D 41/0087 | 322/29 |

(56) References Cited

U.S. PATENT DOCUMENTS

| | | | | |
|---|---|---|---|---|
| 2005/0187052 | A1* | 8/2005 | Yokoyama | F16H 7/1281 474/117 |
| 2005/0192142 | A1* | 9/2005 | Stone | F01L 1/024 474/101 |
| 2005/0192144 | A1* | 9/2005 | Yokoyama | F16H 7/1281 474/117 |
| 2005/0282668 | A1* | 12/2005 | Ali | F16H 7/1218 474/101 |
| 2006/0240922 | A1* | 10/2006 | Pendergrass | F16H 7/1281 474/102 |
| 2006/0249118 | A1* | 11/2006 | Serkh | F01L 1/024 123/198 R |
| 2006/0276284 | A1* | 12/2006 | Lancaster | F02B 67/06 474/110 |
| 2007/0080037 | A1* | 4/2007 | Larry | F02B 67/06 192/21.5 |
| 2007/0261648 | A1* | 11/2007 | Reckels | F01P 7/167 123/41.12 |
| 2008/0220919 | A1* | 9/2008 | Antchak | F16H 7/1218 474/135 |
| 2009/0023546 | A1* | 1/2009 | Licata | F01P 5/12 476/67 |
| 2009/0156340 | A1* | 6/2009 | Seo | F16H 7/1281 474/113 |
| 2009/0186726 | A1* | 7/2009 | Van Maanen | B60K 6/485 474/110 |
| 2009/0195203 | A1* | 8/2009 | Yurgil | B60K 6/485 318/452 |
| 2009/0291790 | A1* | 11/2009 | Harada | F16F 1/545 474/94 |
| 2009/0298646 | A1* | 12/2009 | Parsons | F02N 11/04 477/167 |
| 2010/0065001 | A1* | 3/2010 | Spicer | F02N 15/022 123/179.28 |
| 2010/0102783 | A1* | 4/2010 | McDonald | B60W 10/30 322/23 |
| 2010/0137083 | A1* | 6/2010 | Carlson | F16H 7/1218 474/110 |
| 2011/0048390 | A1* | 3/2011 | Washburn | F01P 7/162 123/568.21 |
| 2011/0112742 | A1* | 5/2011 | Losano | F01P 7/162 701/102 |
| 2011/0118077 | A1* | 5/2011 | Kawasaki | B60K 6/445 477/3 |
| 2011/0312454 | A1* | 12/2011 | Comsa | F01L 1/02 474/110 |
| 2012/0065009 | A1* | 3/2012 | Mueller | F02B 67/06 474/101 |
| 2012/0158226 | A1* | 6/2012 | Prucka | B60K 6/485 701/22 |
| 2012/0197473 | A1* | 8/2012 | Kshatriya | B60L 11/14 701/22 |

FOREIGN PATENT DOCUMENTS

| | | |
|---|---|---|
| CN | 1726361 A | 1/2006 |
| CN | 101497339 A | 8/2009 |
| DE | 2802042 A1 | 7/1979 |
| DE | 3836933 A1 | 5/1990 |
| DE | 3904017 A1 | 8/1990 |
| DE | 3616561 C2 | 10/1990 |
| DE | 4114716 A1 | 11/1992 |
| DE | 3880982 T2 | 10/1993 |
| DE | 69018083 T2 | 10/1995 |
| DE | 19604182 A1 | 9/1996 |
| DE | 19634619 A1 | 3/1997 |
| DE | 69218428 T2 | 10/1997 |
| DE | 19701809 C1 | 9/1998 |
| DE | 19822632 A1 | 11/1999 |
| DE | 19959096 A1 | 12/1999 |
| DE | 19881945 T1 | 1/2000 |
| DE | 19919594 A1 | 11/2000 |
| DE | 10049505 A1 | 5/2001 |
| DE | 10225268 A1 | 12/2003 |
| DE | 102004055428 A1 | 5/2006 |
| DE | 102009045880 A1 | 11/2011 |
| EP | 0228199 A2 | 7/1987 |
| EP | 0337894 A1 | 10/1989 |
| EP | 0676537 A1 | 3/1995 |
| EP | 1564440 A2 | 10/2002 |
| EP | 1438521 A2 | 7/2004 |
| EP | 01511925 A1 | 3/2005 |
| EP | 1552188 B1 | 7/2005 |
| EP | 1573230 B1 | 7/2007 |
| EP | 1564440 B1 | 7/2008 |
| FR | 2899685 A1 | 10/2007 |
| GB | 2158271 A | 11/1985 |
| GB | 2199917 A | 7/1988 |
| JP | 51-003013 B | 1/1976 |
| JP | 54160908 A | 12/1979 |
| JP | 56028339 A | 3/1981 |
| JP | 57105525 A | 7/1982 |
| JP | 57-161344 U | 10/1982 |
| JP | 59-107357 U | 7/1984 |
| JP | 1985007446 U | 1/1985 |
| JP | 60-172048 U | 11/1985 |
| JP | 60-019850 A | 8/1986 |
| JP | 62-10522 Y2 | 3/1987 |
| JP | 1987010522 Y | 3/1987 |
| JP | 62088861 A | 4/1987 |
| JP | 63-97747 U | 6/1988 |
| JP | 01288656 A | 11/1989 |
| JP | 1-310125 A | 12/1989 |
| JP | 02-085061 A | 3/1990 |
| JP | 1990118252 A | 5/1990 |
| JP | 1990225234 A | 9/1990 |
| JP | 1991010041 U | 1/1991 |
| JP | 03050329 A | 3/1991 |
| JP | 1991091559 U | 9/1991 |
| JP | 04252823 A | 8/1992 |
| JP | 04285350 A | 10/1992 |
| JP | 05288261 A | 11/1993 |
| JP | 08-210447 A | 8/1996 |
| JP | 07-054561 A | 9/1996 |
| JP | 1997041985 A | 2/1997 |
| JP | 09-257109 A | 9/1997 |
| JP | 1997184428 A | 9/1997 |
| JP | 08-326853 A | 6/1998 |
| JP | 10150742 A | 6/1998 |
| JP | 1998299847 A | 11/1998 |
| JP | 11-190222 A | 1/2001 |
| JP | 2001-059555 A | 3/2001 |
| JP | 2001-289291 A | 10/2001 |
| JP | 2002138847 A | 5/2002 |
| JP | 2004036820 A | 2/2004 |
| JP | 2004052964 A2 | 2/2004 |
| JP | 2005265039 A | 9/2005 |
| JP | 2006118616 A | 5/2006 |
| JP | 2006125448 A | 5/2006 |
| JP | 2006189073 A | 7/2006 |
| JP | 2006266311 A | 10/2006 |
| JP | 2007024293 A | 2/2007 |
| JP | 2007032678 A | 2/2007 |
| JP | 2007032711 A | 2/2007 |
| JP | 4252823 B2 | 4/2009 |
| JP | 2009257412 A | 11/2009 |
| JP | 2009270642 A | 11/2009 |
| JP | 2010106873 A | 5/2010 |
| JP | 2010121667 A | 6/2010 |
| KR | 1019930025186 B1 | 12/1998 |
| KR | 10030570 B1 | 8/2001 |
| KR | 1020070025396 A | 3/2007 |
| WO | 0000756 A1 | 1/2000 |
| WO | 0057083 A1 | 9/2000 |
| WO | 03036133 A3 | 5/2003 |
| WO | 03104268 A1 | 12/2003 |
| WO | 03104673 A1 | 12/2003 |
| WO | 2004033933 A1 | 4/2004 |
| WO | 2004048808 A1 | 6/2004 |
| WO | 2004061333 A1 | 7/2004 |
| WO | 2004101974 A1 | 11/2004 |
| WO | 2005010401 A1 | 2/2005 |
| WO | 2005119089 A1 | 12/2005 |
| WO | 2006045181 A1 | 5/2006 |

(56) References Cited

FOREIGN PATENT DOCUMENTS

| WO | 2006053617 A1 | 5/2006 |
|---|---|---|
| WO | 2007143830 A1 | 12/2007 |
| WO | 2008113186 A1 | 9/2008 |
| WO | 2009043424 A1 | 4/2009 |
| WO | 2010011720 A1 | 1/2010 |
| WO | 2010094127 A1 | 8/2010 |
| WO | 2011047992 A1 | 4/2011 |
| WO | 2011092206 A1 | 8/2011 |
| WO | 2012031361 A1 | 3/2012 |

OTHER PUBLICATIONS

An Introduction to Thermoelectrics, 2006, Tellurex Corporation.
ICS100 In-Cylinder Sensors, 2007, Penny + Giles Controls Ltd.
Flexible Rotary Drive Shafts, 2008, S.S. White TechnologiesInc. (http://www.sswt.com/automotive.htm).
Choosing Ready-Flex Flexible Shafts with Casing, 2008, S.S. White TechnologiesInc. (http://www.sswt.com/ready_flex_with_casing.htm).
PU Solutions Elastogran—Cellasto Components Complete Industrial Products (Brochure), 2011, BASF.
PU Solutions Elastogran—Cellasto A cellular polyurethane elastomer (Brochure), 2011, BASF.
Elastogran—Innovations in Cellasto (Brochure), 2011, BASF.
Automotive Handbook (8th ed), 2011, Robert Bosch GmbH (SAE International), pp. 987-994.
Honeywell AoB Sensor Catalog, 2011, Honeywell Automation India Ltd.
Honeywell SS 520 Magnetic Hall Position Sensor—Specification Sheet, May 9, 2011, Honeywell International Inc.
SLH100 Hall Effect Contactless Linear Sensor, 2012, Penny + Giles Controls Ltd.
Search Report and Written Opinion for PCT/CA2013/000258, Jul. 10, 2013, ISA.
Elastogran—Cellasto (Brochure), Unknown, BASF.
Elastogran—Cellasto Technical Information, Unknown, BASF.
ED-30 Incremental Linear Encoder, Unknown, Durham Instruments.
Tellurex Power Generation Z-Max Modules Specification Sheet, Unknown, Tellurex Corporation.
Trombetta Throttle Control Kit—P613-K Series, Unknown, Trombetta Motion Technologies.
P/Q Solenoid Families (brochure), Unknown, Trombetta Motion Technologies.
Informal Comments from Applicant re PCT/CA2013/000258, Aug. 28, 2013, Applicant.
International Preliminary Report on Patentability for PCT/CA2013/000258, Oct. 28, 2014, ISA.

* cited by examiner

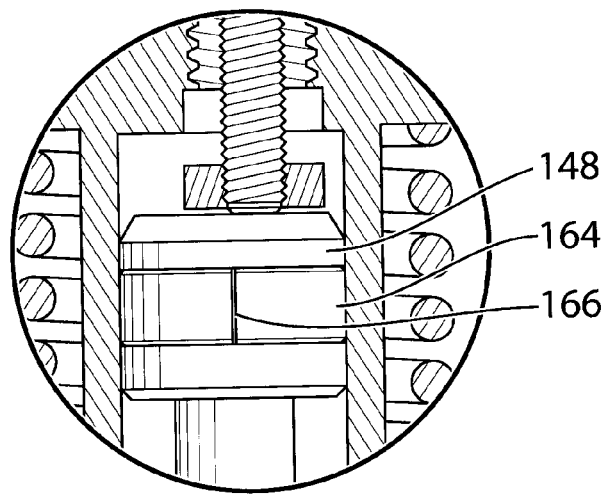
FIG.5
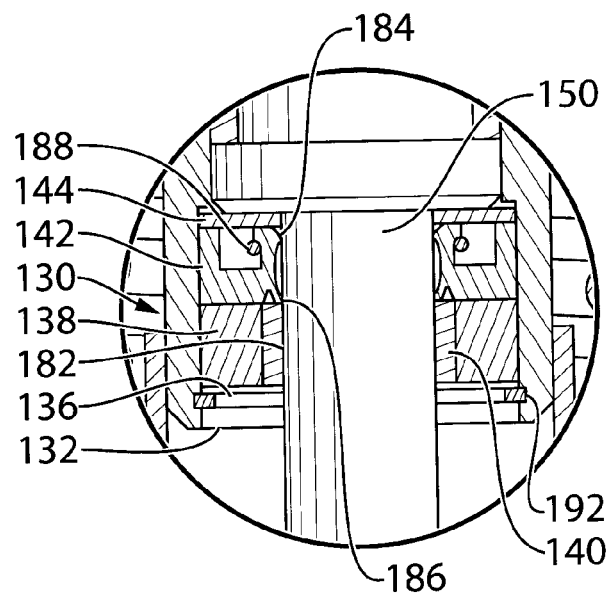 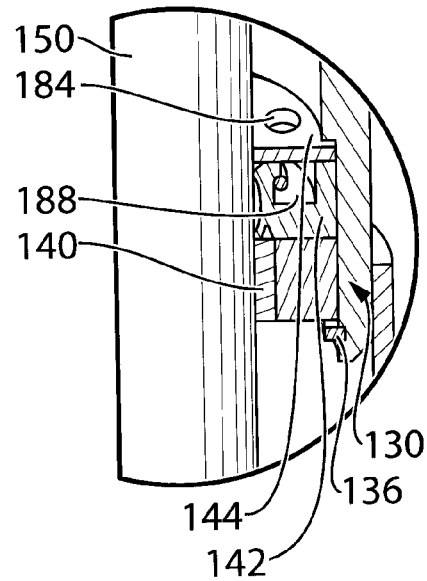
FIG.6 FIG.7

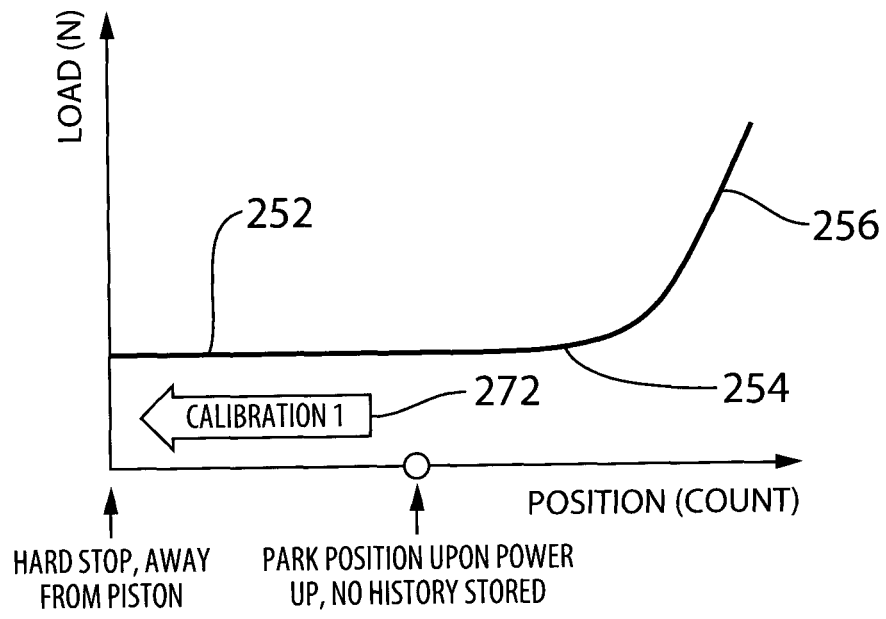
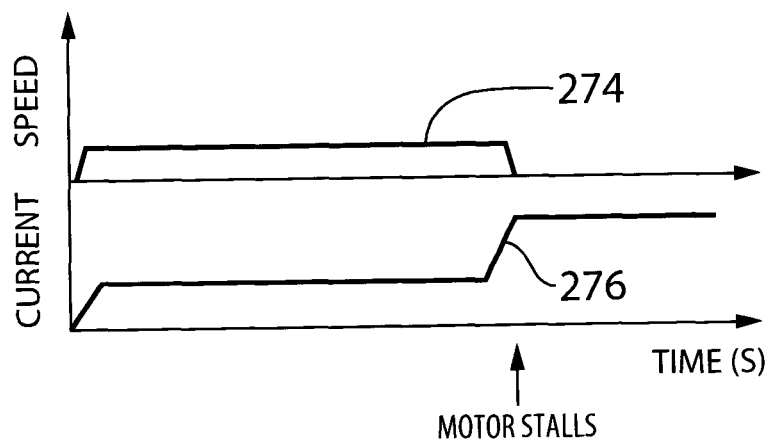
FIG.19

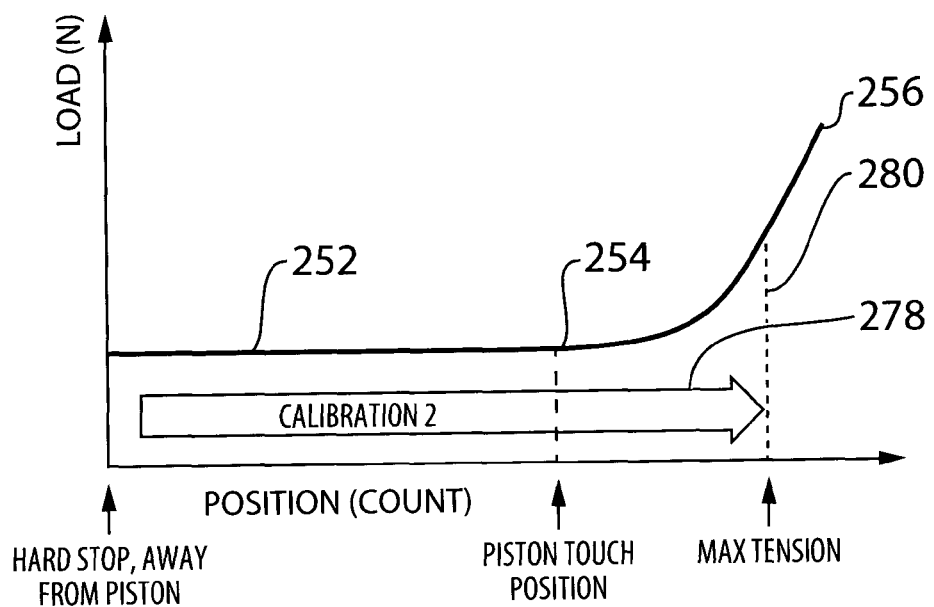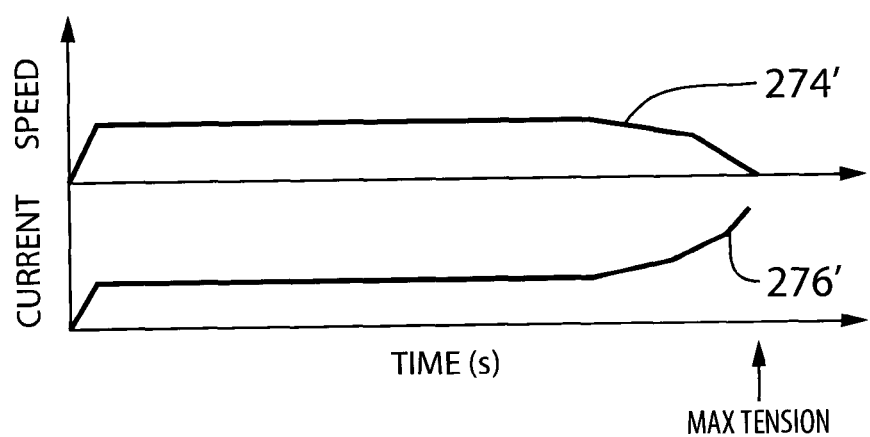
FIG.20

ADJUSTABLE TENSIONER

CROSS-REFERENCE TO RELATED APPLICATIONS

This application claims the benefit of U.S. Provisional Patent Application No. 61/639,859 filed Apr. 28, 2012 and U.S. Provisional Patent Application No. 61/759,392 filed Jan. 31, 2013, the contents of both of which are incorporated herein in their entirety.

FIELD

This disclosure relates generally to the art of belt tensioners and more particularly to belt tensioners for automotive front engine accessory drive systems.

BACKGROUND

U.S. Pat. No. 5,439,420 to Ford Motor Company Limited discloses a belt tensioning device for automotive engines that has an arm pivotally mounted to the engine and pulley rotatably mounted to the arm for contacting the drive belt. The pulley is urged into contact with the drive belt by the arm. The tensioner includes a governor for controlling the rotational motion of the arm. The governor allows the arm to rotate freely in the direction in which the tension of the drive belt is increased and resists the rotation of the arm in the opposite direction where tension of the drive belt decreases. The problem with this device is that the governor is essentially a passive device and there is no assurance that the system will in fact reach a desired tension level.

U.S. Pat. No. 4,478,595 to Nippondenso Co., Ltd. discloses an idler pulley that is radially displaced under control of an actuator for applying a tensioning force on an endless belt of an accessory drive system. A microcomputer calculates drive power and torque necessary for driving the vehicle accessories and based on this calculates an optimum tensioning force for the belt which attempts to maximize the belt power transmission efficiency. The microcomputer calculates an actual tensioning force on the belt based on the compression of a spring and generates a control signal when the calculated actual tensioning force is different from the calculated optimum tensioning force. A drive circuit receives the control signal and operates the actuator in accordance with the difference between the calculated actual and optimum tensioning force. One of the shortcomings of this device is that the amount of tension that it can provide is limited to the variation in force provided by the spring.

U.S. Pat. No. 6,953,407 to Mitsubishi Denki Kabushiki Kaisha discloses an automatic belt tension adjuster for setting the tension of a drive belt in a plurality of stages. The tensioner is applied in a vehicle that utilizes a belt alternator starter. The tension adjuster adjusts the tension of the belt such that the belt tension is set to be greater when the engine is started by the alternator than when the alternator is driven to operate after the engine has been started. The tension adjuster includes: a pulley unit around which the belt is wrapped and an automatic belt tensioner for urging the pulley unit to push the belt. The automatic belt tensioner includes a first cylindrical housing with first and second axial end walls; a piston, which is axially movable within the cylindrical housing, the piston having a planar disk portion having an outer diameter equivalent to an inner diameter of the cylindrical housing; a push rod, which is axially movable within the cylindrical housing and extends through one of the axial end walls to contact the pulley unit, the push rod having a planar disk portion with an outer diameter equivalent to an inner diameter of the cylindrical housing; a first elastically deformable spring arranged between the disk portion of the piston and the disk portion of the push rod; and a control unit that axially moves the piston. One of the shortcomings of this device is that the amount of tension that it can provide is limited to the variation in force provided by the spring.

U.S. Pat. No. 7,217,206 to The Gates Corporation discloses an automatic tensioner having a load cell for detecting and controlling a power transmission belt tension. The tensioner includes a lead screw driven by an electric motor for setting a lever arm/pulley position and thereby a belt load. The tensioner also includes a load cell engaged with a tensioner lead screw for detecting a belt load. The tensioner motor is controlled via a PID control loop using a load cell signal. The controller compares a detected belt load from the load cell with a predetermined belt load value to identify a desired belt load and thereby set a tensioner lever arm position corresponding to the desired belt load. One of the shortcomings of this device is that it requires a load cell which adds cost and complexity to the device. The device also does not compliantly tension the belt.

SUMMARY

In an aspect, a tensioner is provided for a vehicle engine accessory drive system having an endless drive member, at least one drive pulley disposed to drive the endless drive member, and at least one driven pulley disposed to be driven by the endless drive member and connected to drive an accessory. The tensioner includes a tensioner arm mounted to the engine for movement along a path delimited by a free arm position and a load stop position. A tensioner pulley is rotatably mounted to the tensioner arm and the tensioner pulley engages the endless drive member. A biasing means is arranged to urge the tensioner arm in a first direction along the path towards the free arm position, wherein the free-arm position is an end of travel location along the path that the tensioner arm is capable of reaching. An adjustable load stop mechanism including a moveable load stop member, a drive mechanism for moving the load stop member and a control system connected to the drive mechanism is provided. The load stop member arrests movement of the tensioner arm along the path in a second direction, opposite the first direction, to thereby define the load stop position. The load stop member is moveable between a first position correlated to the tensioner free arm position and a second position correlated to a tensioner arm position that is maximally displaced away from the tensioner free arm position. Provided the load stop member is not in the first position, the tensioner arm is unconstrained by the load stop member to move in the first direction toward the free arm position. The drive mechanism includes a motor for moving the load stop member to thereby vary the location of the tensioner arm load stop position, the drive mechanism being operable to move the load stop member from the second position towards the first position and in the process actively drive the tensioner arm towards the free arm position so as to increase tension on the endless drive member. The control system includes a current sensor for measuring current supplied to the motor and a position sensor for determining the position of the load stop member. The control system is operable to i) repeatedly calibrate the tensioner by moving the load stop member from the second position towards the first position and map motor current against the position of the load stop member, ii) receive as an input a desired tension for the endless drive member, and iii) move the adjustable load stop member to a suitable position based on the calibration map.

The suitable position may be a selected retraction distance away from a position where the controller senses a sharp increase in current due to the load stop member driving the tensioner arm to increase belt tension.

The control system may determine the tension applied to the endless drive member based on a nominal design tension provided by the biasing member plus a load stop force that is proportional to the current required to advance a load stop member as it arrests the tensioner arm.

In other aspects, other forms of control systems are provided including closed loop systems based on achieving a targeted tension or tension range on the endless drive member, or achieving a targeted slip or slip range for the endless drive member such as a belt.

In another aspect, a tensioner is provided for a vehicle engine accessory drive system having an endless drive member, at least one drive pulley disposed to drive the endless drive member, and at least one driven pulley disposed to be driven by the endless drive member and connected to drive an accessory. The tensioner includes a tensioner arm pivotally mounted to the engine for movement along a path delimited by a free arm position and a load stop position; a tensioner pulley rotatably mounted to the tensioner arm, the tensioner pulley engaging the endless drive member; a piston pivotally linked to the tensioner arm about a first rotational axis, the piston defining a longitudinal axis and the first rotational axis being located along the longitudinal axis; a housing including a cylinder, the piston being disposed in the cylinder, the housing being pivotally mounted to the engine about a second rotational axis, the second rotational axis being disposed such that a line dawn between the first rotational axis and the second rotation axis is offset by a selected angle from the longitudinal axis; a biasing means acting between the housing and the tensioner arm to urge the tensioner arm towards the free arm position; and a moveable load stop member projecting into the cylinder. An actuator is provided for moving the load stop member and a control system is connected to the drive mechanism. The load stop member abuts the piston to thereby arrest movement of the tensioner arm along the path in a second direction, opposite the first direction, and thus define the tensioner arm load stop position. The load stop member is moveable between a first extended position correlated to the tensioner free arm position and a second retracted position correlated to a tensioner arm position that is maximally displaced away from the tensioner free arm position. Provided the load stop member is not in the first extended position, the tensioner arm is unconstrained by the load stop member to move in the first direction towards the free arm position. This structure is advantageous because the lateral offset between the first and second pivot axes causes a relatively constant side load damping force between the piston and the cylinder even as the surfaces of these components wear.

BRIEF DESCRIPTION OF THE DRAWINGS

The foregoing and other aspects of the invention will be better appreciated with reference to the attached drawings, wherein:

FIG. 5 is a detail view of a piston head employed in the first embodiment;

FIG. 6 is a detail cross-sectional view of a retainer employed in the first embodiment;

FIG. 7 is a detail cut-away view of the retainer shown in FIG. 6:

FIGS. 19-21 are schematic diagrams illustrating a method of calibrating the electrically driven adjustable tensioner;

DETAILED DESCRIPTION OF EXAMPLE EMBODIMENTS

Figure 1:
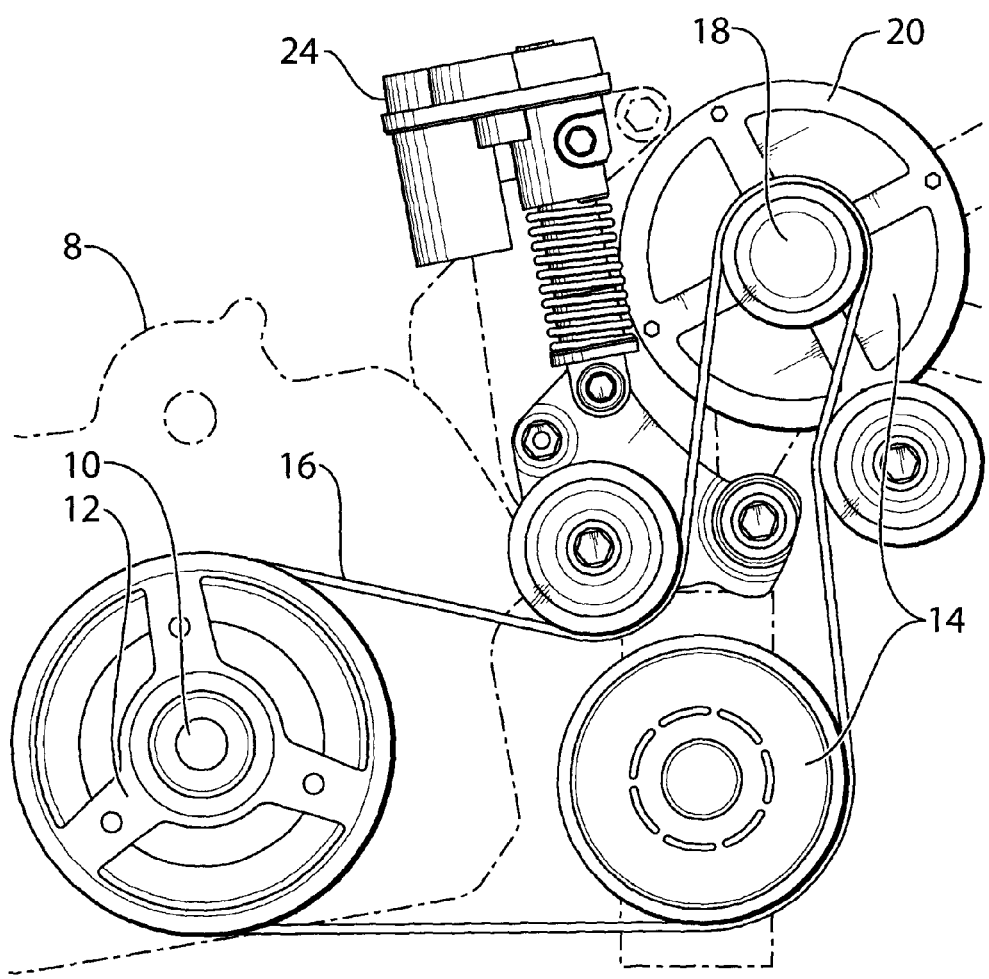
FIG. 1 is a diagram of an accessory drive system incorporating an electrically driven adjustable tensioner in accordance with the invention.

FIG. 1 shows an accessory drive system of a vehicle which is typically disposed at a front end of an engine 8. The engine 8 includes a crankshaft 10 that has a crankshaft pulley 12 mounted thereon. The crankshaft pulley 12 drives one or more vehicle accessories 14 via an endless drive member, such as a belt 16. For convenience the endless drive member will be referred to as a belt, however it will be understood that it could be any other type of endless drive member such as a chain. The accessories 14 may include an alternator, an air conditioning compressor, a water pump, a power steering pump and/or any other suitable accessory.

In FIG. 1, two accessories 14 are shown, however there could be more or fewer accessories. Each of the driven accessories has a shaft 18 and a pulley 20. Optionally, each pulley 20 may be connectable and disconnectable from its respective shaft 18 via a clutch (not shown) so as to permit each of the accessories 14 to be shut off when not needed even though the belt 16 itself is still being driven by the crankshaft 8.

Figure 2:
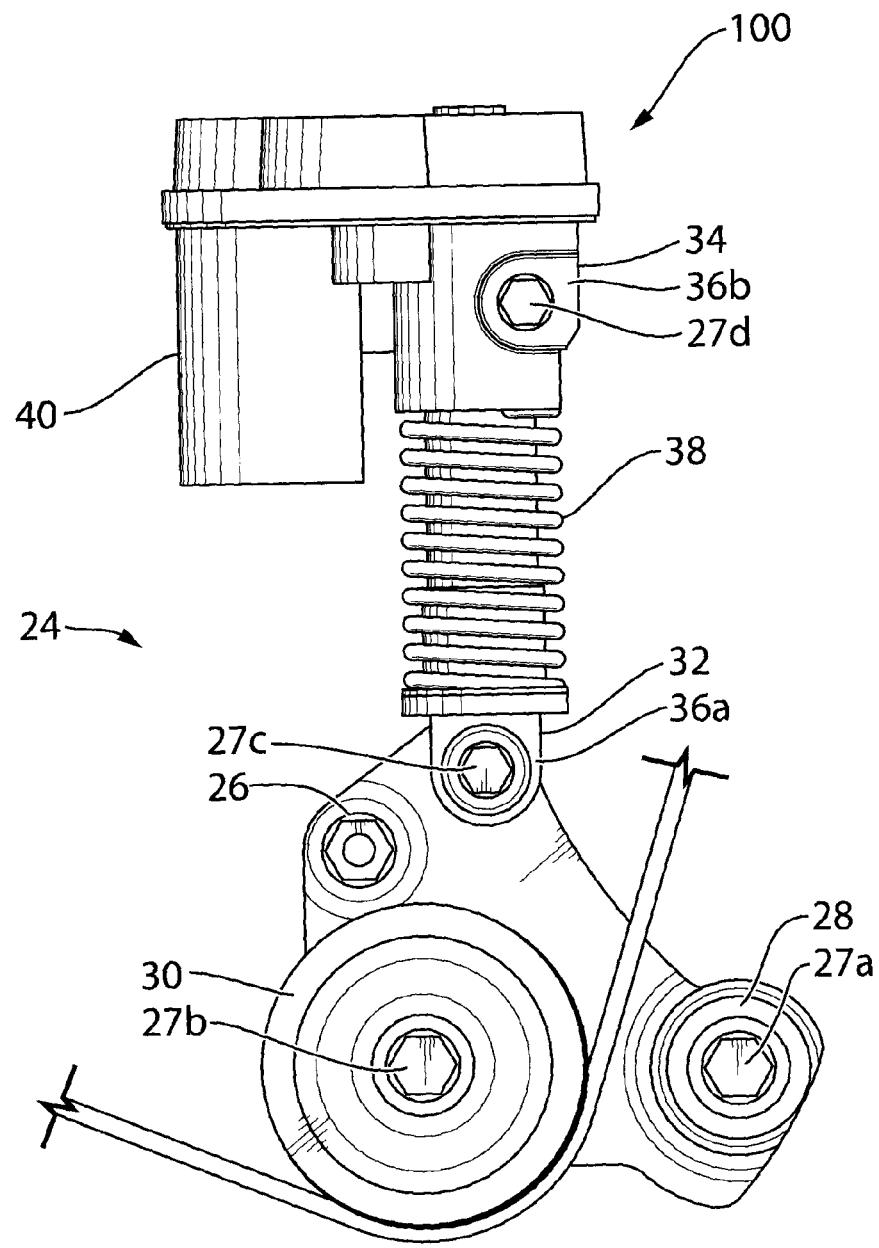
FIG. 2 is an isolated view of the electrically driven adjustable tensioner shown in FIG. 1.

An electrically driven adjustable tensioner 24 is provided to tension the belt 16. The tensioner 24 is shown in isolation FIG. 2. The tensioner 24 includes a tensioner arm 26 that has a damping pivot 28 about a first pivot axis A defined by a pivot shaft 27a attached to the engine 8. A pulley 30 is pivotally mounted to the tensioner arm 26 via a second pivot shaft 27b. A tensioner strut 100 is mounted between the tensioner arm 26 and the engine 8. The tensioner strut 100 includes an extensible member 32 slidably disposed in a housing 34. The extensible member 32 has a pivot mount 36a that is pivotally mounted to the tensioner arm 26 via a third pivot shaft 27c and the housing 34 has a pivot mount 36b that is pivotally mounted to the engine 8 via a fourth pivot shaft 27d. A tensioner arm biasing member 38 such as a coil spring is disposed between the extensible member 32 and housing 34 (as described in greater detail below) so as to urge the extensible member 32 out of the housing 34 and push the tensioner arm 26 towards the belt 16. The tensioner strut 100 has an adjustable load stop position which is provided by an adjustable load stop member (such as an adjustable rod 115 seen in FIG. 3) that controls the depth that the extensible member 32 may be retracted into the housing 34. A drive mechanism or actuator 40 controls the position of the adjustable load stop member.

Thus, the tensioner arm 26 moves along an arcuate path between a 'free arm' position, which is an end of travel location along the path that the tensioner arm 26 is capable of reaching in the direction urged by the biasing member 38, and a load stop position defined by the position of the adjustable load stop member. The adjustable load stop member is capable of moving between a first, fully extended, position correlated to the tensioner free arm position and a second, fully retracted, position correlated to a tensioner arm position that is maximally displaced from the tensioner free arm position. When the adjustable load stop member is not in the first, fully extended, position, the tensioner arm 26 is unconstrained by the adjustable load stop member to move towards the tensioner free arm position.

Figure 9:
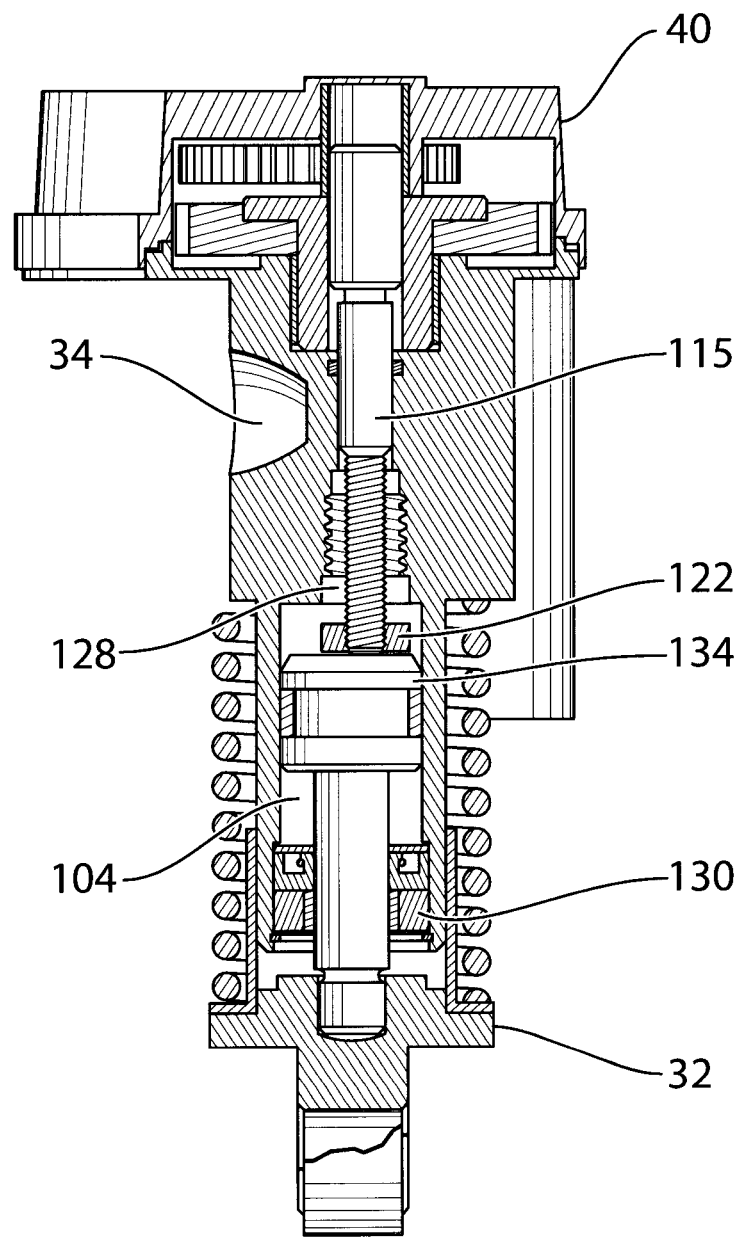
FIG. 9 is a cross-sectional view of the first embodiment in an operating state showing an adjustable load stop member in an active, partially extended state.
Figure 10:
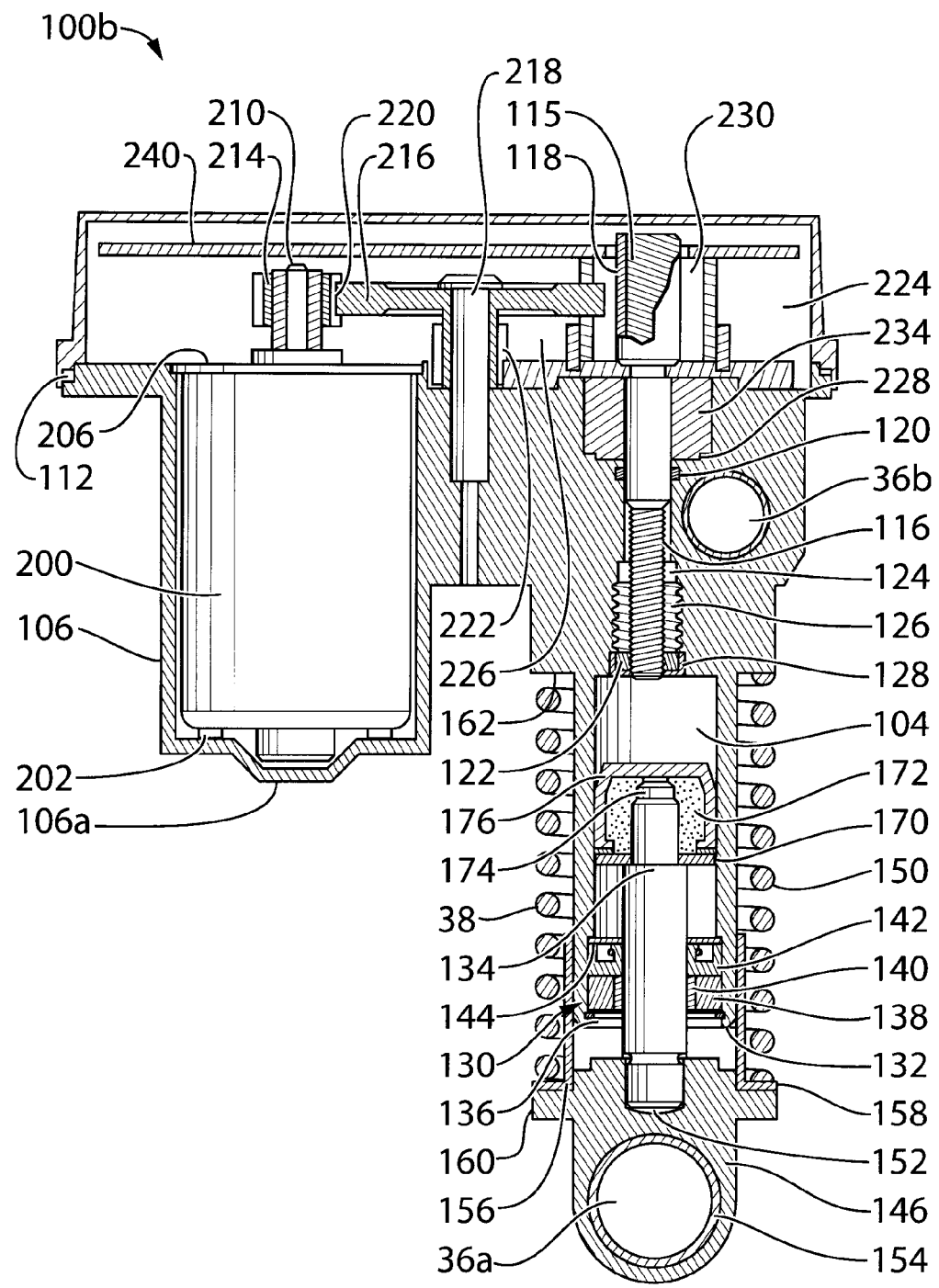
FIG. 10 is a cross-sectional view of a second embodiment of the electrically driven adjustable tensioner shown in FIG. 2.
Figure 11:
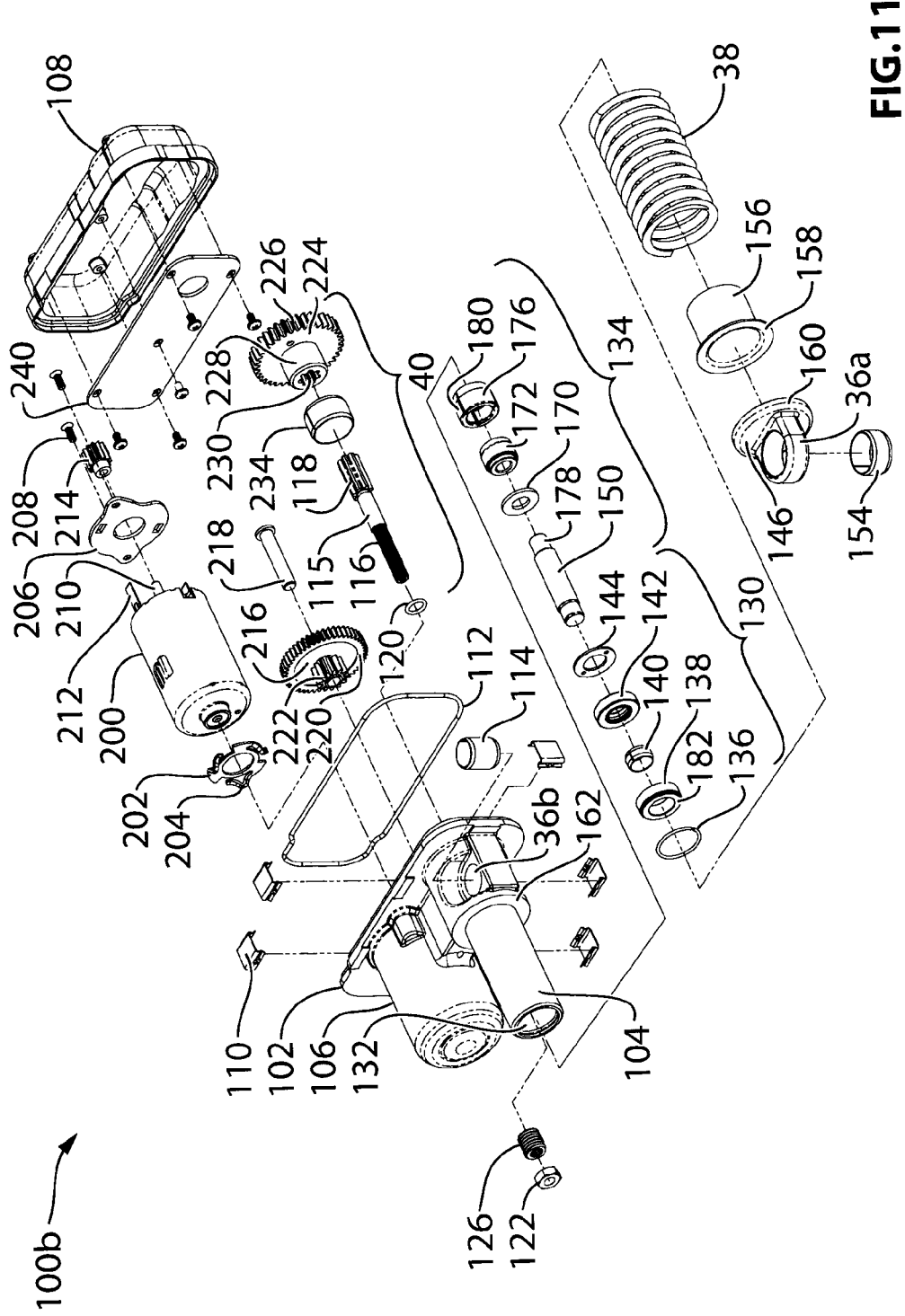
FIG. 11 is an exploded view of the second embodiment.
Figure 12:
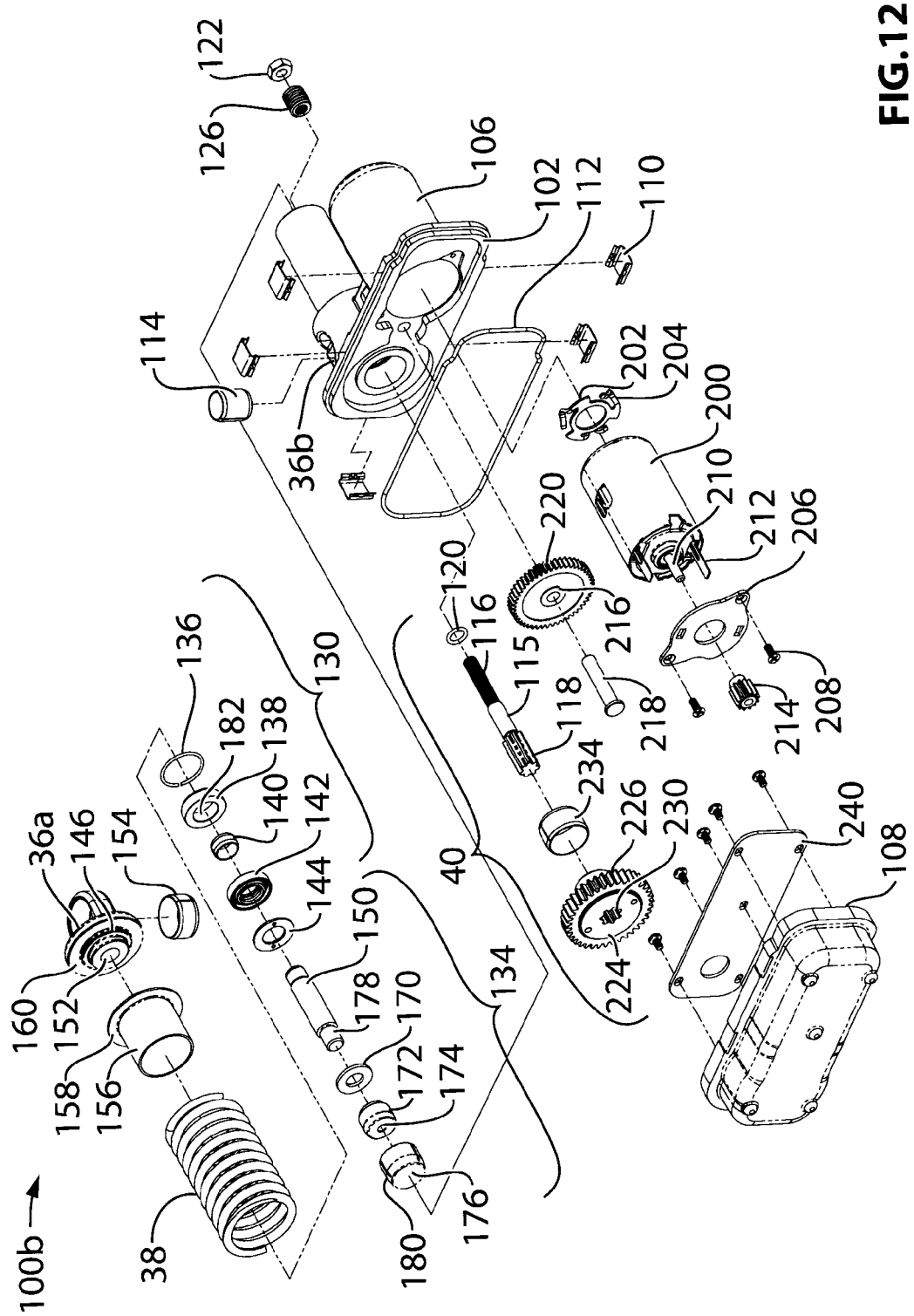
FIG. 12 is an exploded view of the second embodiment taken from an angle of view that is opposite to the angle of view in FIG. 11.

The mechanical structure of the tensioner 100 will now be described in greater detail. FIGS. 1-9 show a first embodiment 100A of the tensioner 100 and FIGS. 10-12 show a second embodiment 100B of the tensioner 100. As the first embodiment 100A is substantially similar to the second embodiment 100B both embodiments will be discussed simultaneously.

Figure 3:
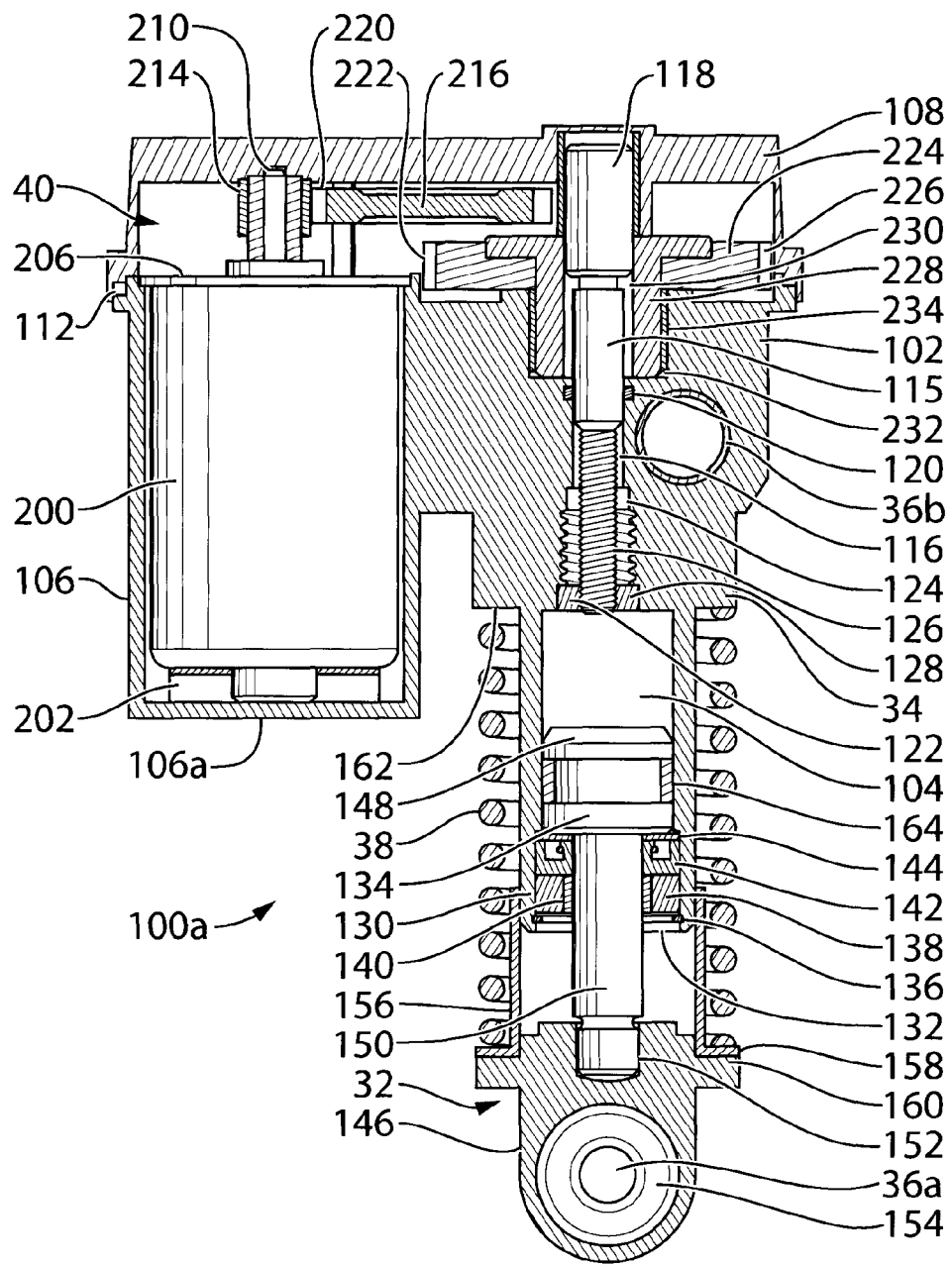
FIG. 3 is a cross-sectional view of a first embodiment of the electrically driven adjustable tensioner shown in FIG. 2.

Referring in particular to the cross sectional view in FIG. 3 of the first embodiment 100A and the opposing exploded views in FIGS. 11 and 12 of the second embodiment 100B, the housing 34 of tensioner 100 comprises a housing portion 102, comprising an integrally formed cylinder 104 and an integrally formed motor enclosure 106, and a cover 108. A series of clips 110 connects the cover 108 to the housing portion 102 and an elastomeric seal 112 is installed between the housing 102 and the cover 108.

The adjustable load stop member is provided by an adjustable rod 115 that has a lead screw thread 116 at one end thereof and axial splines 118 at the other end thereof. An O-ring 120 is mounted about the adjustable rod 115 and a stop 122 is mounted to the lead screw end of the adjustable rod 115.

The housing portion 102 includes a bore 124 (seen best in FIG. 3) with an internal thread portion preferably provided by a threaded insert 126. The adjustable rod 115 is disposed within the bore 124 such that the rod lead screw thread 116 engages the bore internal thread and the rod axial splines 118 mesh with corresponding splines 230 of a hub 228 of a gear 224 as discussed in greater detail below such that the adjustable rod 115 will translate linearly when the actuator 40 is energized to rotate the hub internal gear. When the adjustable rod 115 is fully retracted (as seen in FIG. 3), the stop 122 seats in a recess 128 formed in the housing portion 102.

A retainer 130 is installed within the cylinder 104 adjacent an open end 132 thereof. The retainer 130 prohibits the extensible member 32, which includes a piston 134 as discussed in greater detail below, from completely exiting the cylinder 104 and provides a seal that prevents lubricating fluid from escaping the cylinder chamber, shown at 105 in which the piston 134 moves. The retainer 130 preferably includes a retaining ring or circlip 136, a cylinder head guide 138, a cylinder head bushing 140, a dynamic seal 142 and a washer 144, as discussed in greater detail below.

The extensible member 32 includes the piston 134 which is connected to a pivot bracket 146. The piston 134 has a head 148, which contacts the interior wall of the cylinder 104, and a shaft 150, which passes through the retainer 130. The pivot bracket 146 includes a cavity 152 in which the piston shaft 150 is fixedly press fit. The pivot bracket 146 incorporates the pivot mount 36a, in which a pivot bushing 154 is installed.

A dust shield 156 is disposed about the pivot bracket 146 and the outer wall of the cylinder 104 to cover the (varying) gap between the pivot bracket 146 and the cylinder 104 and prevent debris from entering the tensioner strut 100. The dust shield 156 has a flange 158 that abuts a flange 160 provided in the pivot bracket 146. The pivot bracket flange 160 also supports one end of the coil spring 38, with the dust shield flange 158 sandwiched therebetween. The other end of the coil spring 38 is supported by a flange 162 provided in the housing portion 102. The coil spring 38 is also supported against buckling by the outer wall of the cylinder 104.

In embodiment 100A seen in FIG. 3, the piston head 148 is integrally formed with the piston shaft 150. For lubrication purposes a preferably pressurized 50/50 air/oil mixture is provided in the cylinder 104 at pressures preferably of about 30-70 psi. This air/oil mixture is in the form of an emulsion so that the air is trapped in the oil and they do not separate. This creates a compressible substance that fills the cylinder 104. In embodiments where fluid damping is not desired, a split bushing 164 having a gap 166 (as seen in the detail view of FIG. 5) may be mounted about a circumferential groove formed in the piston head 148. The gap 166 in the split bushing 164, combined with the clearance between the piston head 148 and interior wall of the cylinder 104, will allow sufficient flow of the air/oil mixture from one side of the piston head 148 to the other side so as to prevent any material fluid damping. Alternatively, if fluid damping is desired, the orifices between one side of the piston head 148 and the other may be made sufficiently small to provide substantial fluid damping.

In embodiment 100B shown in FIGS. 10-12, the piston head 148 is provided by three components: a washer 170, a powdered metal body 172 with a hole 174 along a top surface thereof, and a plastic (e.g., Nylon) damping head 176. The washer 170 abuts a circumferential flange 178 provided in the piston shaft 150. The powdered metal body 172 is press fit onto the piston shaft 150 and the damping head 176 is press-fit onto the powdered metal body 172. The damping head 176 has axial orifices 180 along the outer side thereof to allow sufficient flow of the air/oil mixture from one side of the piston head 148 to the other side so as to prevent any material fluid damping, or, if desired, the orifices may be made small enough to provide substantial fluid damping. In this embodiment the damping head 176, being situated adjacent the hole 174 in the powdered metal body 172, has some flex in it to dampen the impact of the piston head 148 against the adjustable rod 115 and reduce noise as the piston head reciprocates due to fluctuating loads from the accessory drive system reacted through the tensioner arm 26.

In either embodiment 100A, 100B, when the adjustable rod 115 enters the cylinder 104 the compressible substance compresses due to the adjustable rod 115 occupying progressively more of the available volume in the cylinder 104, leaving less space available for the compressible substance. As a result, a forward force is exerted on the piston 134 towards the open end 132 of the cylinder 104 and the compressible substance will act in cooperation with the coil spring 38.

Referring additionally to FIGS. 6 and 7 which provide detail views of the retainer 130, it will be seen that the cylinder head guide 138 includes a central bore 182 for passage of the piston shaft 150. The cylinder head guide 138 provides stability against side loading generated in the tensioner strut 100. The cylinder head bushing 140 is mounted within the central bore 182 and the material properties of the cylinder head bushing 140 may be selected to provide a desired level of friction against the piston shaft 150 for damping purposes.

The dynamic seal 142 features a slightly curved inner surface so as to provide top and bottom circumferential sealing lips 184, 186. The washer 144 is provided to receive loads from the piston head 148 when the extensible member 32 is fully extended but includes holes 184 (FIG. 7) for transmitting pressure from the air/oil mixture into a circumferential cavity 188 formed in the dynamic seal 142. The pressure in the cavity 188 is utilized to push the sealing lips 184, 186 against the piston shaft 150. The dynamic seal 142 preferably also includes a metal ring 190 for generating additional radial pressure so as to ensure that at least the upper lip 184 contacts the piston shaft 150 even under low pressures.

The circlip 136 is embedded in a circumferential groove 192 formed at the open edge of the cylinder and locks the other elements of the retainer 130 in the cylinder 104 even under pressure.

Figure 8:
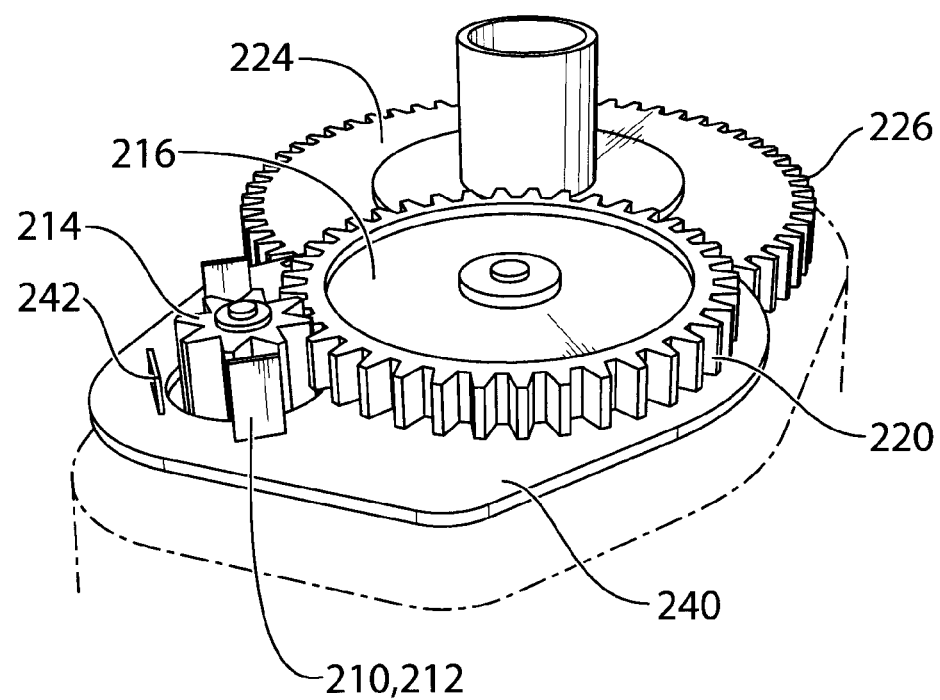
FIG. 8 is a detail perspective view of a actuator employed in the first embodiment.

With reference to FIGS. 3 and 8 of the first embodiment 100A and FIGS. 11-12 of the second embodiment 100B, the actuator 40 includes a bidirectional dc motor 200 that is installed in the motor enclosure 106. A spacer 202 with radially extending spring lobes 204 centers the motor 200 within the motor enclosure 106 and spaces one end of the dc motor 200 away from the enclosure end wall 106a. An adapter plate 206 is fitted over the other end of the motor 200 so as to enable the motor 200 to be mounted to the housing portion 102 via screws 208. The motor 200 has an output shaft 210 and positive and negative power blades 212 that extend through the adapter plate 206.

A pinion 214 is mounted on the motor output shaft 210. A compound gear 216 is mounted to the housing portion 102 via a dowel shaft 218. (It will be noted that the cross-sectional view of FIG. 3 is taken along a plane that does not show the dowel shaft.) The compound gear 216 includes an outer gear wheel portion 220 and an inner gear wheel portion 222. A final gear 224 having an outer edge comprising gear teeth 226 and the axially projecting hub 228 with the internal splines 230 is also mounted to the housing portion 102, which includes a recess 232 in which a bushing 234 and the axially projecting hub 228 are installed. The motor pinion 214 meshes with the outer gear wheel portion 220 of the compound gear 216 and the inner gear wheel portion 222 of the compound gear 216 meshes with the gear teeth 226 of the final gear 224. Thus energizing the motor 200 results in the rotation of the final gear 224 and consequently the hub 228. The gear ratio may be selected by those skilled in the art to provide suitable power and responsiveness with a fractional horsepower motor; for example, a gear ratio of 10:1, 20:1 or 30:1 may be utilized.

A printed circuit board (PCB) 240 with circuitry for driving the dc motor 200 is installed within the cover 108 although the PCB 240 may be omitted as discussed in greater detail below.

A position sensor measures the position of the adjustable load stop member. In the illustrated embodiment the position sensor is a Hall effect sensor 242 that can count the pinion gear teeth as the pinion 214 rotates or alternatively another sensor trigger such as a magnet may be mounted on the pinion 214 so that the sensor can count the number of motor turns and hence the position of the adjustable rod 115. Other forms of position sensors known in the art such as linear or rotary encoders may be employed in the alternative. The position sensor is preferably mounted on the PCB 240 which preferably also carries a current sensor 266 (see FIGS. 16-18) for determining the amount of current supplied to the motor 200.

Figure 4A:
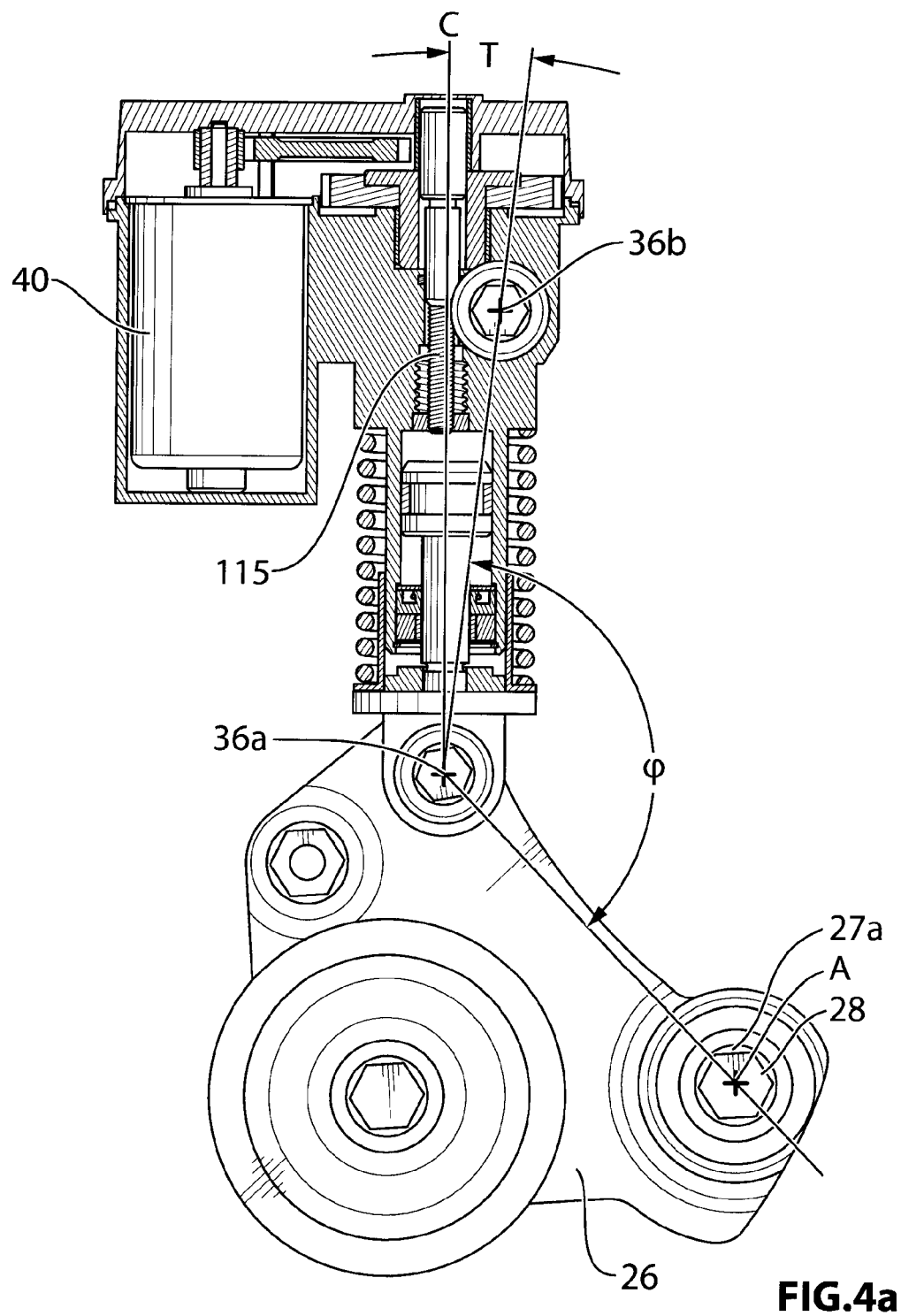
FIGS. 4A and 4B are cross-sectional views of the first embodiment in compressed and free-arm positions, respectively.
Figure 4B:
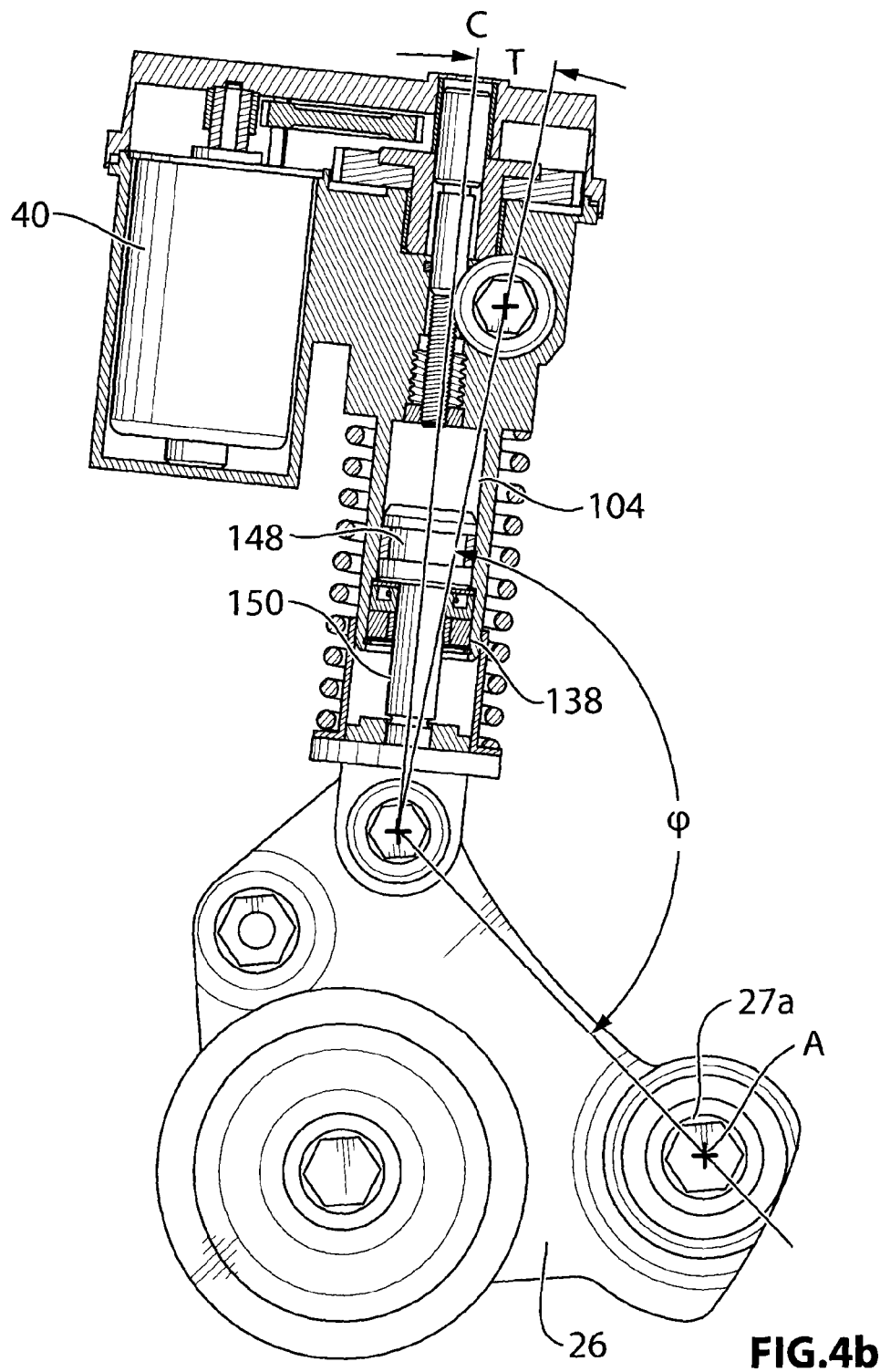

FIG. 4A shows the tensioner strut 100 in a compressed or 'install' position. In this condition the adjustable rod 150 is fully retracted so that the piston 134 is fully seated in the cylinder 104. The coil spring 38 is fully compressed. FIG. 4B (as well as FIG. 3) shows the tensioner strut 100 in an extended or free arm position where, due to the bias of the coil spring 38, the piston 134 is urged out of the cylinder 104 and extends to a maximum point where the piston head 148 contacts the retainer 130. In an example, the full stroke of the piston 134 may be in the range of about 7 mm to about 15 cm.

With reference to FIGS. 4A and 4B, angle $\phi$ references an angle between the center of the housing pivot mount 36b and the center of the damping pivot 28 about the extensible member pivot mount 36a. The angle $\phi$ differs between the install position and the free arm position. By way of example, the angle $\phi$ may be about 150 degrees in the install position and 125 degrees in the free arm position.

Angle T references an angle between a centerline C of the piston/cylinder 134/104 and the center of the housing pivot mount 36b about the extensible member pivot mount 36a. The center of the extensible member pivot mount 36a is located along the centerline C so the angle T also defines a lateral offset between the housing pivot mount 36b and the extensible member pivot mount 36a. This lateral offset causes one side of the piston head 148 (more particularly, the split bushing 164 in embodiment 100A or the damping head 176 in embodiment 100B, generally referred to as the piston head damping surface) to be driven against the interior wall of the cylinder 104 more than on the other side of the piston head 148. This is advantageous because as the piston damping surface and/or the interior surface of the cylinder 104 wear, the offset will still drive one side of the piston damping surface into the cylinder in essentially the same way and the damping force generated therefrom will be approximately consistent over time even as the surfaces wear. Likewise, the piston shaft 150 will be driven against one side of the cylinder head bushing 140 more than the other side of the piston shaft 150 and the damping force generated therefrom will be approximately consistent over time even as the respective surfaces wear.

In one example, the total damping force provided by the tensioner strut 100 may be approximately 25-30 Newtons. In this example, the tensioner 24 requires about 60 Newtons in order to effectively dampen oscillations and most of the damping force is provided by the damping pivot 28 as known in the art. In an example, the damping at the damping pivot 28 may be provided by any of the damping structures shown in patent and patent application publications: DE10053186, DE19524403, US20080280713 and US20090275432.

The angle T, the bias force of the coil spring, and the selection of materials dictates the damping force. The table below shows an example of how the damping force may vary in relation to changes in the angle T (other variables being held constant):

| Angle T (degrees) | Side Load Force (N) |
|---|---|
| 6.1 | 40 |
| 6.7 | 60 |
| 7.1 | 75 |

In operation the piston 134 is free to move within the cylinder 104 (subject to the relatively minor damping force that occurs as the piston moves) in response to the oscillations in the tensioner arm 26 as a result of load fluctuations caused by the engine 8 and accessories 14. The position of the adjustable rod 115 defines the load stop position of the tensioner strut 100, and correspondingly, the load stop position of the tensioner arm 26. FIG. 9 shows a situation where the adjustable rod 115 is moved into the cylinder chamber 105, prohibiting the piston 134 from fully retracting into the cylinder 104 and thus defining an alternative load stop position (that differs from the load stop position shown, for example, in FIG. 4). Other forms of adjustable load stop members may be utilized in the alternative. For example, instead of a linearly moving rod, the rod may rotate in situ and the rod screw thread may be connected to a traveler nut that moves linearly in which case the traveler nut is the adjustable load stop member.

The actuator may 40 move the adjustable load stop member into a desired position within the cylinder 104 when the piston/extensible member 32 is fully extended such that the adjustable load stop member does not encounter any significant load. More preferably however, the actuator 40 is sufficiently powerful to move the adjustable load stop member against a loaded piston 134 (i.e., a piston loaded as a result of a reaction force received from the belt 16) to the point where the piston/extensible member 32 is fully extended, whereby the tensioner arm 26 reaches its free arm position, or to any intermediate point in the cylinder 104. Thus, for example, the actuator 40 may directly drive a loaded piston 134 from a fully retracted position shown in FIG. 4A to an intermediate position shown in FIG. 9.

Figure 13:
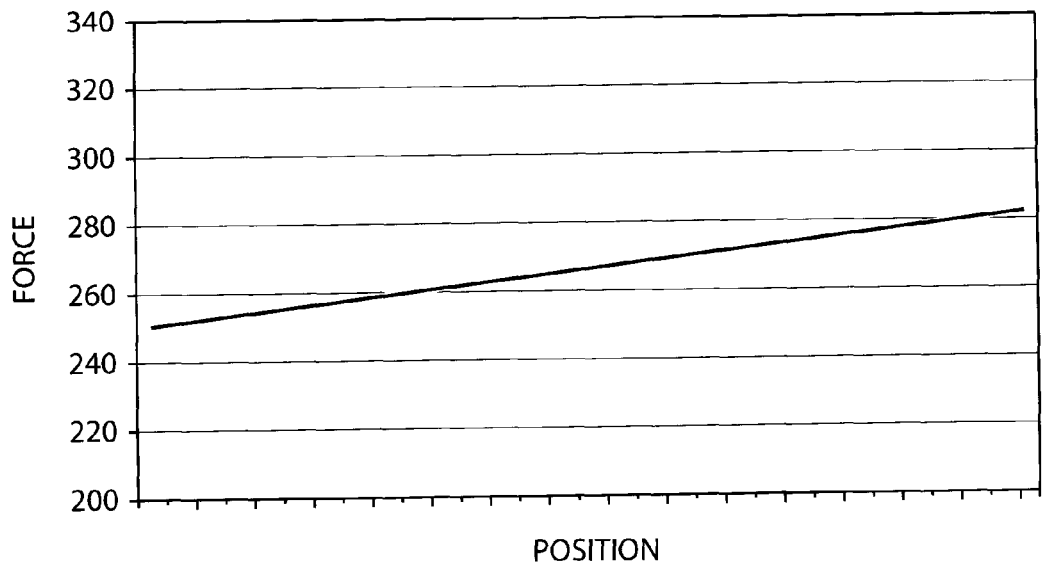
FIG. 13 is graph showing belt tension provided by electrically driven adjustable tensioner under static equilibrium conditions when the adjustable load stop member is in an inactive, fully retracted state.

The load stop position has a significant effect on the resultant belt tension. FIG. 13 plots belt tension under static equilibrium conditions when the adjustable load stop member is fully retracted. The static tension varies linearly with the compression of the coil spring 38.

Figure 14:
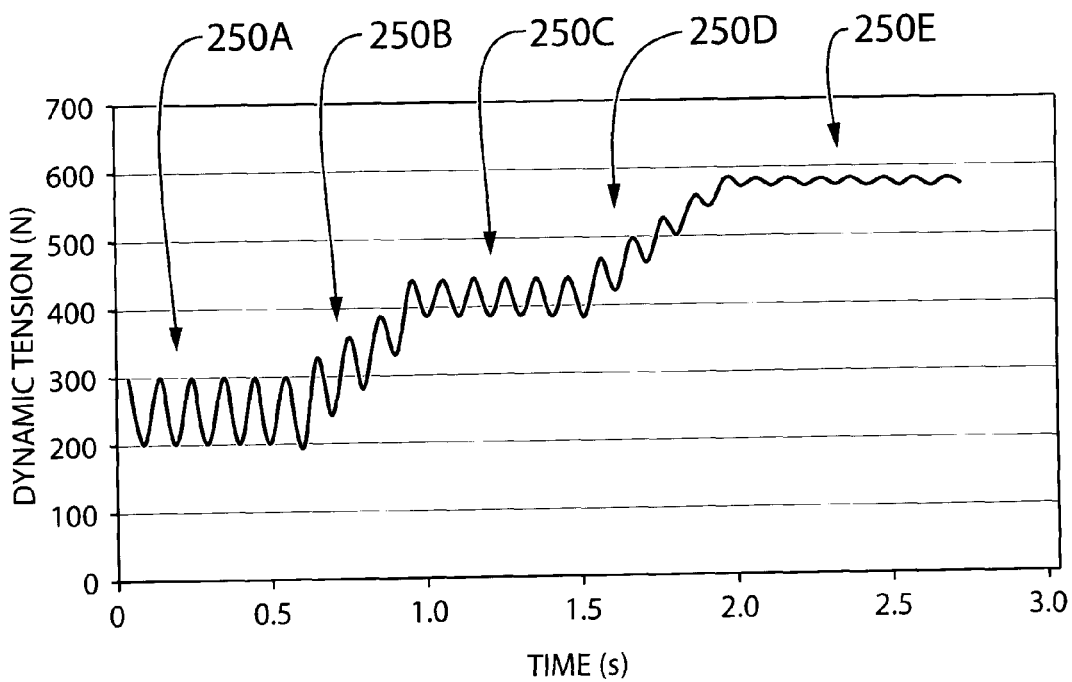
FIG. 14 is graph showing belt tension provided by electrically driven adjustable tensioner under dynamic conditions as the adjustable load stop member is moved from an inactive, fully retracted) state through to an active, fully extended state.

FIG. 14 plots the dynamic tension of the belt 16 as a function of the load stop position. In an initial segment 250A of the plot corresponding to a time period from 0 to about 0.5 seconds, the adjustable load stop member is fully retracted and the dynamic belt tension varies over a first tension range, for example between about 200-300N, with an average of about 250N. In this state, the piston 134 does not bottom out in the cylinder 104 and/or contact the adjustable load stop member. (Note that if the piston does bottom out in the cylinder the average dynamic belt tension would rise.) At a subsequent segment 250B of the plot corresponding to a time period of about 0.5 to 1 seconds, the adjustable load stop member is moved, pushing the piston/extensible member 32 toward the belt 16. The belt 16 is a compliant member and thus the average dynamic belt tension increases although it still fluctuates due to allowable reciprocation of the coil spring 38. (The belt tension does not 'clip' because the belt is itself an elastic member capable of stretching under load.) At a subsequent segment 250C of the plot corresponding to a time period from about 1 to 1.5 seconds, the adjustable load stop member is kept at an intermediate load stop position. In this state, the coil spring 38 has less room to compress/decompress and thus the dynamic belt tension varies over a smaller range (e.g., about 390-440N) although, as result of the piston/extensible member 32 abutting the load stop provided by the adjustable load stop member, the average dynamic belt tension (e.g., about 425N) is higher than the situation in segment 250A because the piston/extensible member 32 is pushed into the belt 16. At a subsequent segment 250D corresponding to a time period of about 1.5 to 2 seconds, the adjustable load stop member is moved forwardly, pushing the piston/extensible member 32 further toward the belt 16, whereby the average tension continues to increase. At a subsequent segment 250E of the plot corresponding to a time period from about 2 seconds onwards, the adjustable load stop member is kept at a fully extended load stop position. In this state, the coil spring 38 has substantially no room to compress and thus the dynamic belt tension hardly varies. However, the belt tension is at a maximum, e.g., (about 590N) due to the force of the adjustable load stop member pushing the piston/extensible member 32 into the belt 16.

The tensioner 24 may thus be operated in the following modes: i) a compliant low tension mode, where the adjustable load stop member/load stop is fully retracted; ii) a non-compliant high tension mode, where the adjustable load stop member/load stop is fully extended so that the extensible member 32 remains fully extended; and iii) a semi-compliant intermediate tension mode, where the adjustable load stop member/load stop is partially extended so that the extensible member 32 remains partially extended.

The belt tension is a function of the spring force, provided by the coil spring and the compressible substance, and the load stop force. Under static equilibrium conditions, when the adjustable load stop member is fully retracted, the piston 134 is presumed to be located in the middle of the cylinder 104 such that the load force is zero. Hence the belt tension is provided only by the spring force, arising from the compression of the coil spring relative to its rest state and the gas spring force provided by the compressible substance. This is referred to herein as the nominal design tension. (In the example shown in FIG. 13, the nominal design tension is about 265N.) Under dynamic conditions, the spring force will vary depending on the variation in the spring force provided by the compressible substance and the variation in the spring force provided by the coil spring. Thus, the belt tension under dynamic conditions can be calculated as the nominal design tension+the load stop force+the spring force variation. The spring force from the compressible substance will vary depending on the position of the adjustable load stop member in the cylinder, but the change may be relatively small and can be ignored for practical purposes. The coil spring force will depend on the position of the piston and hence the amount of compression in the coil spring, which can be measured by a linear encoder or distance sensor if desired. However, to avoid the need for an additional sensor to determine the position of the piston 134, the belt tension can be sensed for practical purposes by appreciating that the coil spring force will vary over a limited range. (For example, if the coil spring is a 10 N/mm spring and has a travel range once installed of about 3 mm fore or aft, the variation in belt tension due to the coil spring is anywhere from zero to plus or minus 30 N.) As such, by determining the load stop force and adding it to the known nominal design tension, a belt tension range can be determined. This can also be viewed as a determination of a mean belt tension to within a tolerance level.

Figure 15:
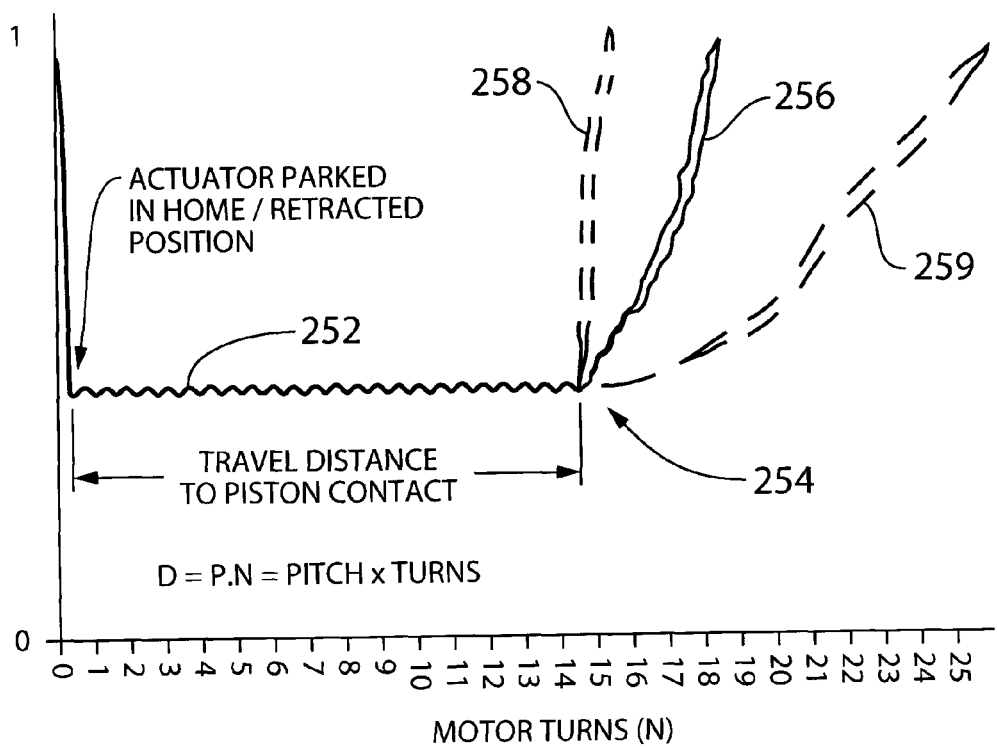
FIG. 15 is a graph plotting motor current against the position of the adjustable load stop member as measured by motor turns.

The load stop force is preferably determined by determining the amount of current required by the actuator 40 to move the piston 134 when loaded (the motor torque required to increase the belt tension will be proportional to the required current). FIG. 15 shows a graph of motor current I based on the position of the adjustable load stop member as measured by the number of motor turns N. As the adjustable load stop member initially moves from its fully retracted position there is no contact with the piston 134 and only a small baseline current 252 (sufficient to overcome frictional forces) is required to move the adjustable load stop member. At point 254, the adjustable load stop member encounters resistance from the loaded piston 134 and the required current 256 to move the adjustable load stop member against the loaded piston increases substantially in comparison to the baseline current 252. Progressively greater current is required to progressively move the adjustable load stop member/loaded piston and increase the tension on the belt 16, and indeed, the slope of the current curve 256 is dependent on the stiffness or modulus of elasticity of the belt. (The stippled plots 258 and 259 show current curves for a stiffer chain and a more elastic belt such as one made from polyester as opposed to Aramid fibers in the central example 256.)

The tensioner 24 can thus be practically controlled utilizing only an adjustable load stop member position sensor (as provided by the Hall effect sensor 242 which measures motor turns) and a current sensor 266 for measuring the load stop force.

If desired, the known position of the adjustable load stop member provided by the position sensor can also be utilized to estimate the variance in the compressible substance spring force and the coil spring force and reduce the tolerance of the estimated mean belt tension.

Figure 16:
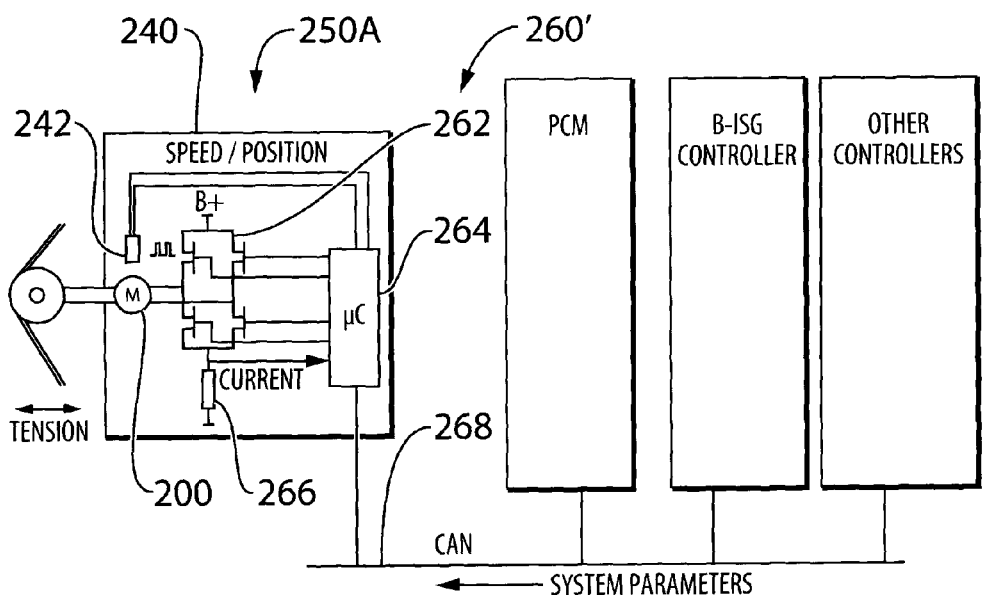
FIG. 16 is a diagram of a control system for the electrically driven adjustable tensioner in accordance with a first implementation.
Figure 17:
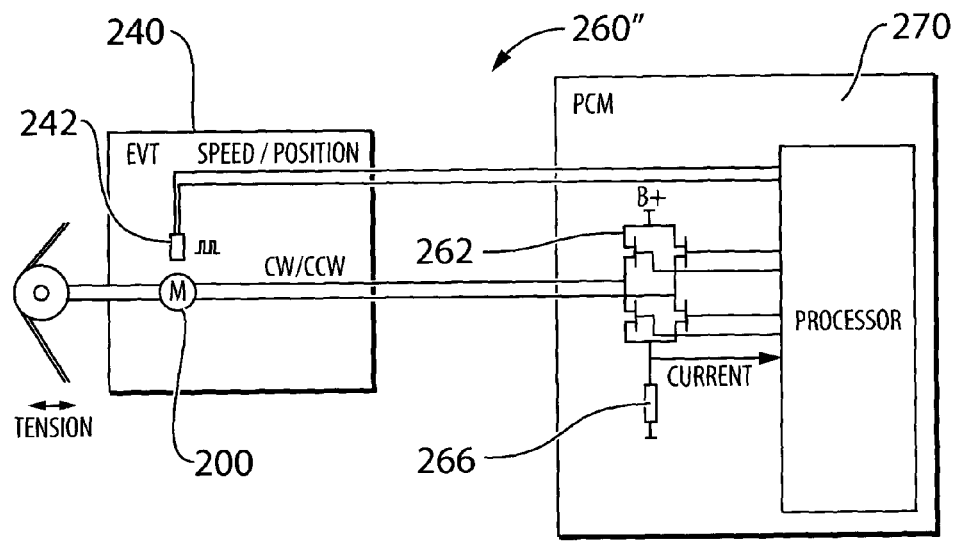
FIG. 17 is a diagram of a second implementation of the control system.
Figure 18:
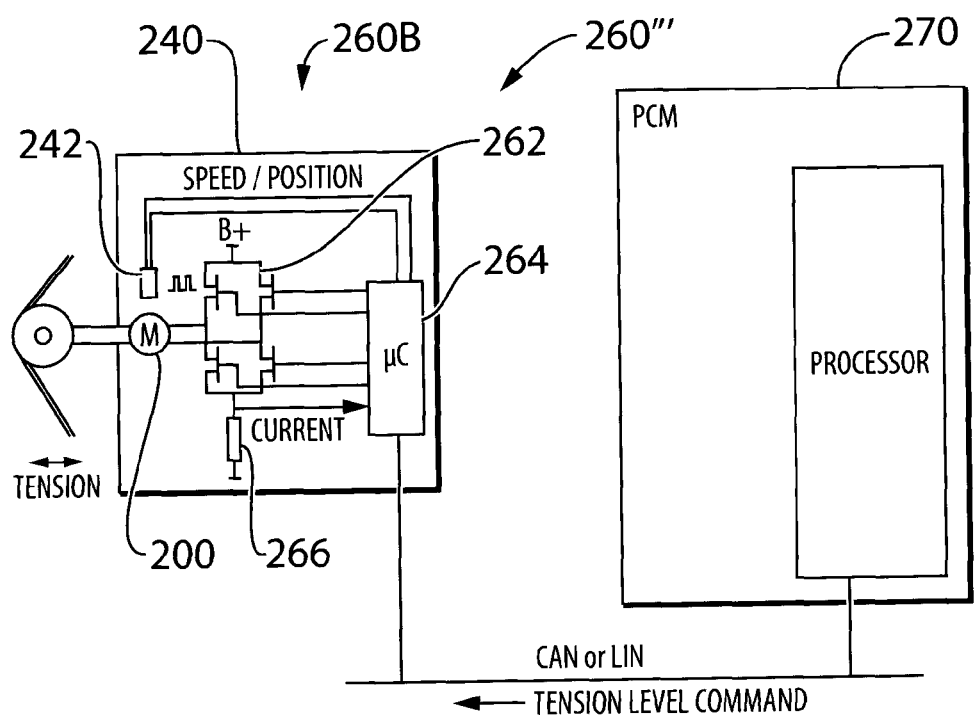
FIG. 18 is a diagram of a third implementation of the control system.

A control system 260 for the tensioner 24 may be configured in a variety of ways. FIG. 16 shows one embodiment 260' of control system 260 in which the tensioner 24 includes an autonomous front engine accessory drive (FEAD) controller 260A where substantially all of the control logic resides on the internal PCB 240, including a motor current driver 262 and a microcontroller 264, as well as the position sensor such as the Hall effect sensor 242 and the current sensor 266. In this case, the controller 260A receives system parameters from the vehicle over its command area network (CAN) 268 and the onboard microcontroller 264 determines a desired tension level and carries out all control routines. For example, in a hybrid vehicle which has an internal combustion engine in combination with an electric propulsion motor and a belt alternator start (BAS) system, the system parameter may be the mode that the vehicle is in, such as 'normal', 'boost', or 'BAS'. FIG. 17 shows another embodiment 260" of the control system 260 in which the tensioner 24 is a 'dumb' device where the PCB 240 only carries the position sensors 242 and all control logic and current drivers 262 are located at a remote control module 270. FIG. 18 shows another embodiment 260'" of the control system 260 in which the tensioner 24 is in a mixed situation where the control logic is split between low level 'housekeeping' routines carried out by the onboard controller 260B and high level control routines are carried out by a remote controller 270. For example, in the hybrid vehicle the remote controller may command a desired tension level or similar parameter and the onboard microcontroller carries out the control routines to achieve such result. Those skilled in the art will understand that digital and analog control logic can be centralized or distributed over one or more physical devices and a wide variety of other control schemes may be implemented in the alternative.

The tensioner 24 can be controlled utilizing a variety of control schemes, depending on the application (and a single vehicle may utilize the tensioner in multiple applications depending on the vehicle mode).

For example, the tensioner 24 may be utilized in a binary manner wherein the tensioner operates in either a low or high tension mode. In the low tension mode the adjustable load stop member is fully retracted and in the high tension mode the adjustable load stop member is fully extended for maximum belt tension. This application may be suitable for situations where it is possible to pre-cognitively anticipate required belt tension, for example, in a vehicle that employs an internal combustion engine and a BAS. When such a vehicle comes to a stop and the engine is momentarily turned off, the control system 260 places the tensioner 24 in the high tension mode in anticipation of the BAS start and after the engine is started the control system places the tensioner 24 in the low tension mode. Other precognitive situations in which the binary application may be employed are disclosed PCT Publication WO 2012/031361 to the assignee hereof.

Figure 21:
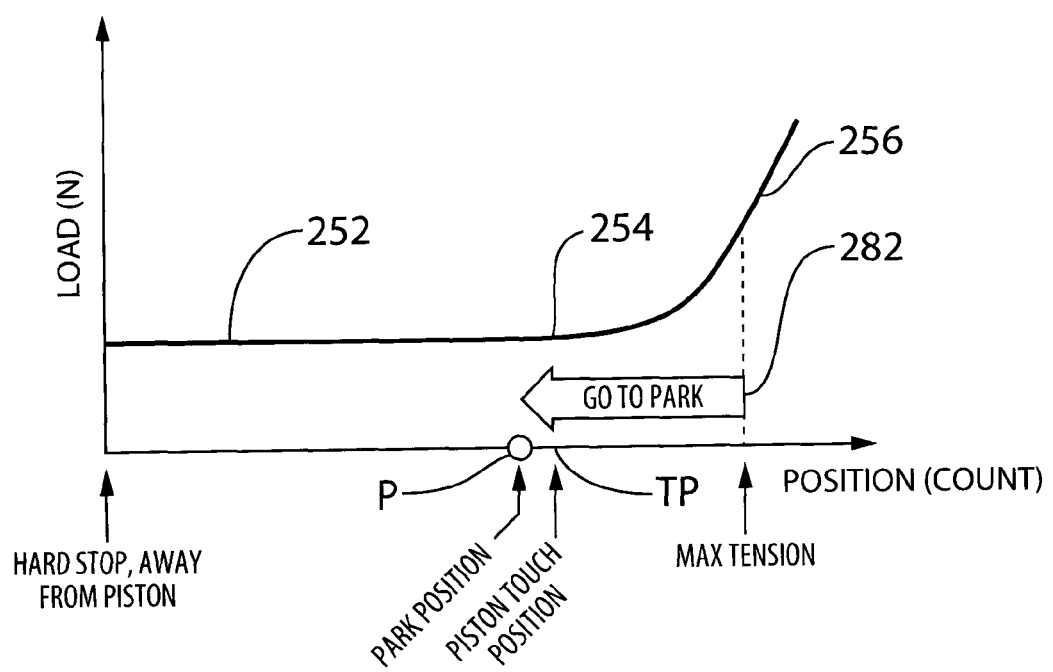

The foregoing application, however, may not be effective if the vehicle has a more sophisticated drive train. For example in the hybrid vehicle discussed above the vehicle can also enter a boost mode where the alternator functions as an electric propulsion motor to assist the internal combustion engine. When under boost, the foregoing low tension mode may have insufficient tension to prevent belt squeal due to slip whereas the foregoing high tension mode may result in excess belt tension that would affect fuel economy or drive efficiency while the vehicle is under boost. In this case the control system 260 may utilize an alternative low tension mode where the adjustable load stop member is moved to an intermediate position. Preferably, the intermediate load stop position is determined dynamically. Referring additionally to FIGS. 19-21, the control system 260 preferably calibrates the tensioner 24 upon startup and every time it shifts to the high tension mode. In FIG. 19 the tensioner control system 260 has just been powered up and, not knowing the position of the adjustable load stop member due to the use of a relative position sensor, in a first phase 272 it begins to fully retract the adjustable load stop member. In this case the current sensor 266 will measure the baseline current 252 until the adjustable load stop member beds in its fully retracted position (in embodiment 100A or 100B, the stop 122 of the adjustable rod 115 seats in the housing recess 128) at which point the motor 200 will stall and the current will spike. (See also motor speed and current sensor readings 274, 276 corresponding to the first phase 272.) This enables the control system 260 to identify the fully retracted position of the adjustable load stop member. In FIG. 20, in a second phase 278, the control system 260 moves the adjustable load stop member forward until the current reaches a predetermined level 280 that is correlated to a maximum belt tension that the tensioner 24 is designed to provide. (See also motor speed and current sensor readings 274', 276' corresponding to the second phase 278.) In the process the control system 260 maps the current level against the position of the adjustable load stop member as measured by motor turns and notes the initial touch position TP of the piston based on the current level exceeding the baseline 252 by a threshold amount. In FIG. 21, in a third phase 282, the control system 260 retracts the adjustable load stop member to a park position P. The park position P is a relative distance, which may be referred to as a retraction distance, by which the adjustable load stop member is backed away from the initial touch position TP of the piston 134. The retraction distance is selected so that when the vehicle is under boost, the piston 134 will rather quickly abut the adjustable load stop member so that belt squeal is avoided but when the vehicle is not under boost and operating normally the coil spring 38 still has room to compress and decompress in order to accommodate fluctuating loads from the accessory drive system. The retraction distance may be, for example, 1, 2 or 3 mm. The control system 260 may frequently repeat this calibration process, for example, upon power up and/or every time the tensioner transitions from the dynamic low tension mode to the high tension mode. In this manner the tensioner 24 can adapt to changing conditions in the belt, for example due to ambient temperature fluctuations or stretch in the belt as it ages. In addition, although in embodiments 100A, 100B the adjustable rod 115 has a screw thread 116 which discourages back drive so that it is not necessary to continuously supply electrical power to the actuator 40, over time vibration may dislodge the adjustable rod from its intended position and therefore frequent periodic recalibration of the tensioner ensures that the adjustable rod 115 is appropriately positioned.

In an embodiment, the control system 260 may adjust the park position P of the adjustable load stop member as follows: Upon reaching a position wherein the control system determines that the adjustable load stop member has engaged the piston, the control system 260 drives the motor to retract the load stop member by a selected number of turns. The position (e.g. the absolute position of the load stop member, or a position relative to the piston 134) may be recorded in memory. At some point, when the control system 260 determines that a higher tension setting is needed, the load stop member is driven by the motor towards the piston. Based on the recorded position of the load stop member, the control system 260 can determine the expected number of turns that the load stop member will be required to undergo before reaching a selected current indicative of the higher tension setting. If the control system 260 detects that the number of turns were required to reach the selected current is different than the expected number of turns, the control system 260 may adjust the park position by some amount. In an example, if the control system 260 expects to require 3 turns of the load stop member to reach the selected current, but measures the selected current after 5 turns due, for example, to expansion of the belt resulting from a high ambient temperature, then the control system 260 may adjust the park position by one turn forward. For greater clarity the amount that the park position is adjusted need not be equal to the difference between the number of expected turns and the number of actual turns to reach the selected current. Instead, the park position may be adjusted based on an average (e.g. a weighted average) of the current park position and the current park position+the difference between the expected and actual number of turns. A reason that the park position may be adjusted by some other amount than the difference between the expected and actual number of turns, is to account for the possibility that the actual number of turns was an anomaly that was the result of some dynamic tension fluctuation in the belt, (e.g. a torsional).

Figure 22:
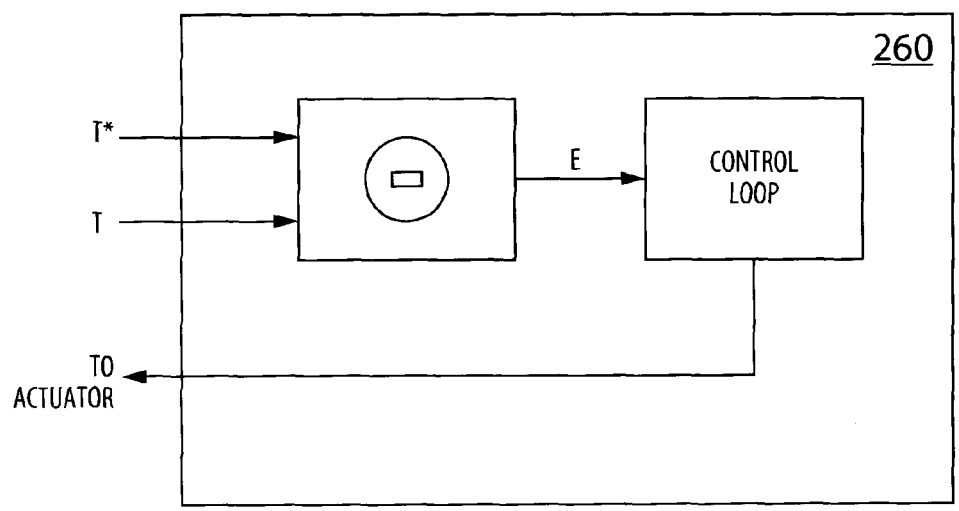
FIGS. 22-23 are block diagrams of control schemes for the electrically driven adjustable tensioner.

FIG. 22 shows another application where the tensioner control system 260 receives a desired or target mean belt tension T* and the control system 260 moves the adjustable load stop member accordingly in order to reach the desired target. In this application the control system 260 measures the actual mean tension T through the current vs. position map as discussed previously to determine an error. The error E may be fed into a linear (proportional) control or a more complex control loop such as a PI (proportional, integral) or PID (proportional, integral, derivative) control as known in the art which takes history and/or rate of change into account. To increase the tension, the control system 260 moves the adjustable load stop member forward while mean belt tension feedback is received from the current sensor 266. To reduce the tension the control system 260 may back off the adjustable load stop member a considerable amount and then drive it into position so that the mean belt tension may be determined via the current sensor (which must be pushed forward into the loaded piston to determine belt load). Alternatively, through the feedback received from periodic recalibration as discussed above the current vs. position map may be relied on to determine the appropriate load stop position to achieve the target tension. As the mean belt tension is expected to have some tolerance in it, the control loop is preferably configured so that the difference (E) between the target (T*) and measured (T) mean belt tension must exceed a threshold greater than the tolerance (and/or have a very slow derivative segment) so that the control system 260 is precluded from continuously adjusting the actuator to reach a desired tension level. This application may be suitable in instances where it is desired to maximize energy efficiency by periodically changing belt tension in response to varying drive conditions, for example, depending on which accessories are currently active. This application may also be utilized in precognitive situations by setting the desired tension values.

The foregoing control methodology may also be utilized to implement a fuzzy logic application where the belt tensioner is operated, for example, between very low, low, medium, high and very high tension setting, with each setting representing a tension range. The tension ranges may overlap one another to provide hysteresis and minimize 'hunting' or frequent mode changes.

Figure 23:
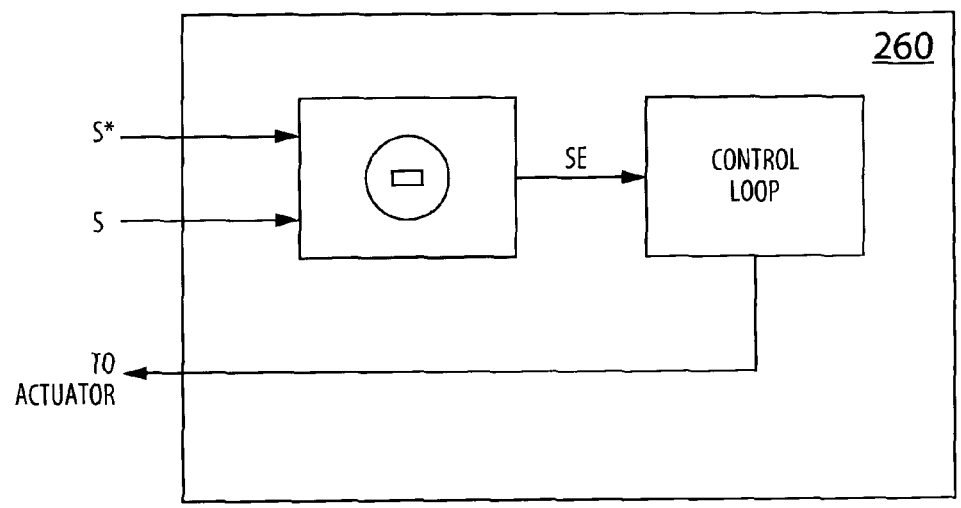

FIG. 23 shows another application where the tensioner control system 260 receives belt slip data S and the control system 260 moves the adjustable load stop member in order to reduce the belt slip S below a desired amount S*. Many techniques are known in the art for determining belt slip, including those discussed in PCT Publication WO2012/031361 to the assignee hereof, which document is incorporated by reference herein in its entirety. The belt slip error SE may be fed into a linear (proportional) control loop or a more complex control such as a PI (proportional, integral) or PID (proportional, integral, derivative) control as known in the art which takes history and/or rate of change into account. To reduce slip the belt tension is increased and the control system 260 moves the adjustable load stop member forward until the error SE is reduced to an acceptable tolerance. To increase belt slip (for instance, when the tension is too high or the belt slip is reading zero for too long) the control system 260 reduces the belt tension by slowly or intermittently backing off the adjustable load stop member until slip reaches an acceptable level (for example 1%).

Figure 24:
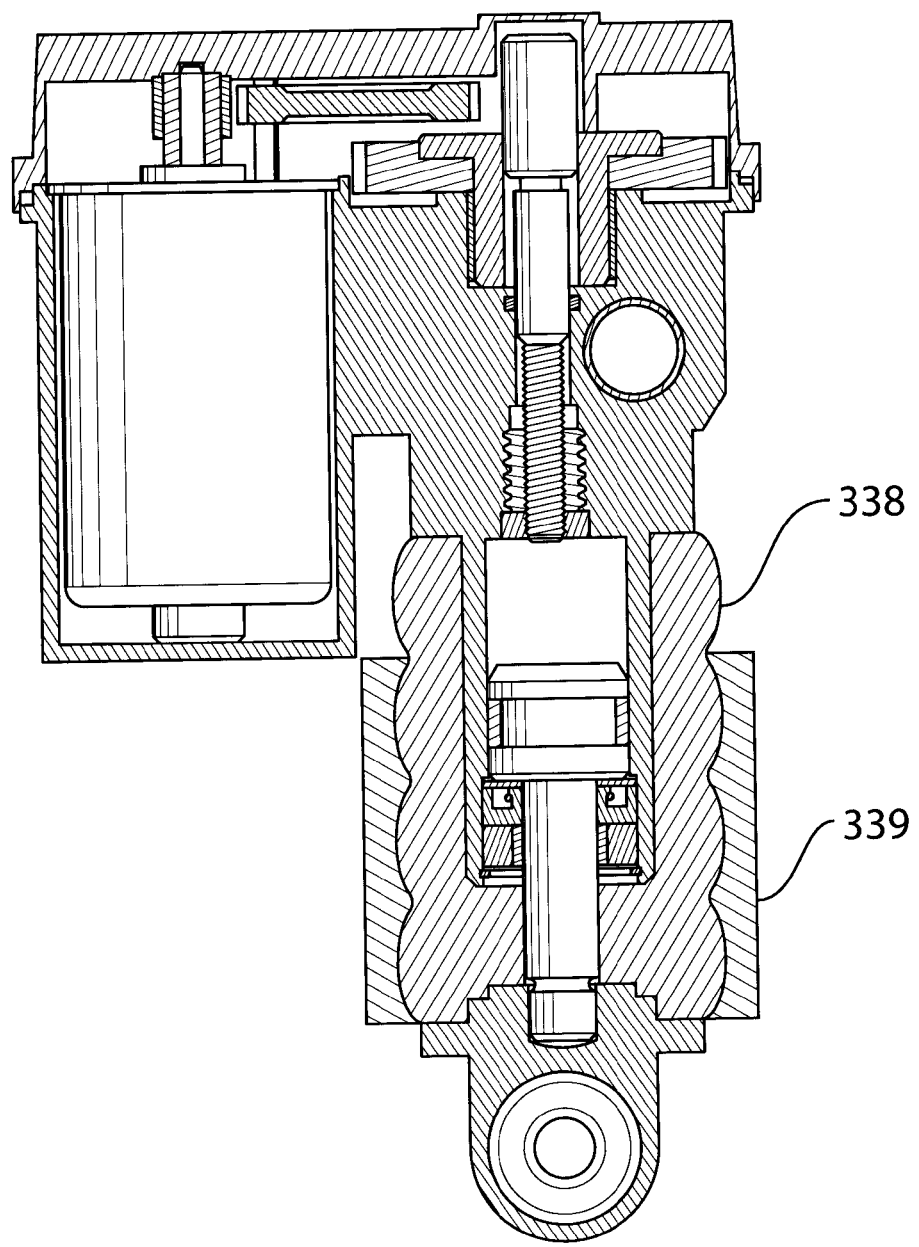
FIG. 24 is a cross-sectional view of an embodiment of the electrically driven adjustable tensioner, incorporating a closed-cell foam spring.

A variety of modifications may be made to the foregoing embodiments while retaining the same or substantially the same functionality. For example, FIG. 24 illustrates that the biasing member could be a closed cell foam member 338, which may optionally have a retaining shield 339 surrounding it, instead of the coil spring 38. A closed cell foam spring can be configured to compress without billeting when compressed to a selected fraction of its original height (e.g. 80% of its original height), and also can be configured to have one or more effective spring rates so as to as two or more springs in series. Configuring the spring 338 to have multiple spring rates can be achieved by contouring the outer diameter of the closed cell foam material to provide two or more effective wall thicknesses, and/or by providing sections of the spring 338 in series, wherein each section has different material properties (e.g. density).

Alternatively, or simultaneously to the above, the air/oil emulsion within the piston could be partially or entirely eliminated and replaced with some form of lubricated closed cell foam spring mechanism, which would be tuned to work closely in parallel (or in series) with the main outer spring mechanism. If used inside the piston, the outer surface of the CCF closed spring could be textured, striated, or otherwise molded with pockets or markings, which could be employed to retain grease or oil for lubrication of the internal piston as it moves within the inner tube, in order to ensure continued lubrication of the piston over time.

When the piston makes contact with the adjustable load stop member, noise, vibration and harshness (NVH) issues may arise and damage to the piston may result due to repeated metal to metal impact in embodiment 100A. To reduce such issues a layer of closed cell foam (e.g., BASF Cellastico in USA/Elastogran in EP) may be utilized between the end of the adjustable load stop member and the piston.

While a Hall effect sensor has been utilized to determine the position of the adjustable load stop member, other types of sensors can be used, including absolute position sensors, such as an LVDT across the cylinder. Another type of sensor that can be used is an angular position sensor on the pivot mount for the tensioner arm. This sensor could detect changes in the angular position of a circular (or, more precisely, disk-shaped) magnet which is connected for rotation with the tensioner arm and is aligned with the hub axis Ah. The magnet has a north pole that makes up 180 degrees of the magnet (i.e. a hemi-disk), and a south pole that makes up the other 180 degrees (i.e. the other hemi-disk). The position sensor may be any suitable type of sensor that can detect the change in the position of the north and south poles of the magnet as the arm pivots about the hub axis Ah. An example of a suitable sensor is a model 2SA-10 Sentron sensor provided by Sentron AG, of Zug, Switzerland. A suitable position sensing system (made up of a sensor and a circular magnet) is shown and described in U.S. Pat. No. 7,188,021, which is incorporated herein by reference in its entirety.

While the description contained herein constitutes a plurality of embodiments of the present invention, it will be appreciated that the present invention is susceptible to further modification and change without departing from the fair meaning of the accompanying claims.

The invention claimed is:

1. A tensioner for a vehicle engine accessory drive system having an endless drive member, at least one drive pulley disposed to drive the endless drive member, and at least one driven pulley disposed to be driven by the endless drive member and connected to drive an accessory, the tensioner comprising:
    a tensioner arm mounted to the engine for movement along a path delimited by a free arm position and a load stop position;
    a tensioner pulley rotatably mounted to the tensioner arm, the tensioner pulley engaging the endless drive member;
    a biasing means arranged to urge the tensioner arm in a first direction along the path towards the free arm position, wherein the free-arm position is an end of travel location along the path that the tensioner arm is capable of reaching; and
    an adjustable load stop mechanism including a moveable load stop member, a drive mechanism for moving the load stop member and a control system connected to the drive mechanism;
    wherein the load stop member arrests movement of the tensioner arm along the path in a second direction, opposite the first direction, to thereby define the load stop position;
    wherein the load stop member is moveable between a first position correlated to the tensioner free arm position and a second position correlated to a tensioner arm position that is maximally displaced away from the tensioner free arm position, and wherein, provided the load stop member is not in the first position, the tensioner arm is unconstrained by the load stop member to move in the first direction toward the free arm position;
    wherein the drive mechanism includes a motor for moving the load stop member to thereby vary the location of the tensioner arm load stop position, the drive mechanism being operable to move the load stop member from the second position towards the first position and in the process actively drive the tensioner arm towards the free arm position so as to increase tension on the endless drive member; and
    wherein the control system includes a current sensor for measuring current supplied to the motor and a position sensor for determining the position of the load stop member, the control system being operable to
    i) repeatedly calibrate the tensioner by moving the load stop member from the second position towards the first position and map motor current against the position of the load stop member,
    ii) receive as an input a desired tension for the endless drive member, and
    iii) move the adjustable load stop member to a suitable position based on the calibration map.

2. A tensioner according to claim 1, wherein the suitable position is a selected retraction distance away from a position where the controller senses a sharp increase in current due to the load stop member driving the tensioner arm to increase belt tension.

3. A tensioner as claimed in claim 1, wherein the control system determines the tension applied to the endless drive member based on a nominal design tension provided by the biasing member plus a load stop force that is proportional to the current required to advance a load stop member as it arrests the tensioner arm.

4. A tensioner as claimed in claim 1, wherein:
the tensioner arm is pivotally linked to a piston;
the piston is disposed in a cylinder;
the cylinder includes a threaded opening;
the adjustable load stop member is provided by a threaded rod which meshes with the cylinder threaded opening such that rotation of the rod in a first rotational direction extends the rod into the cylinder and rotation of the rod in a second, opposing, rotational direction retracts the rod from the cylinder, whereby the movement of the tensioner arm in the second direction is arrested as a result of the piston abutting the threaded rod.

5. A tensioner as claimed in claim 4, wherein the biasing means acts between the cylinder and piston.

6. A tensioner as claimed in claim 4, wherein the piston has a hole in line with the rod and a plastic or elastomeric membrane covers the hole and contacts the rod.

7. A tensioner as claimed in claim 4, wherein the cylinder includes an oil/air mixture therein and the piston includes orifices to enable the air/oil mixture to flow across the piston.

8. A tensioner as claimed in claim 1, wherein in the engine accessory drive system a drive pulley and a driven pulley are capable of reversing roles such that the driven pulley becomes a drive pulley and the drive pulley becomes a driven pulley.

9. A tensioner for a vehicle engine accessory drive system having an endless drive member, at least one drive pulley disposed to drive the endless drive member, and at least one driven pulley disposed to be driven by the endless drive member and connected to drive an accessory, the tensioner comprising:
a tensioner arm pivotally mounted to the engine for movement along a path delimited by a free arm position and a load stop position;
a tensioner pulley rotatably mounted to the tensioner arm, the tensioner pulley engaging the endless drive member;
a piston pivotally linked to the tensioner arm about a first rotational axis, the piston defining a longitudinal axis and the first rotational axis being located along the longitudinal axis;
a housing including a cylinder, the piston being disposed in the cylinder, the housing being pivotally mounted to the engine about a second rotational axis, the second rotational axis being disposed such that a line dawn between the first rotational axis and the second rotation axis is offset by a selected angle from the longitudinal axis;
a biasing means acting between the housing and the tensioner arm to urge the tensioner arm towards the free arm position; and
a moveable load stop member projecting into the cylinder, an actuator for moving the load stop member and a control system connected to the drive mechanism;
wherein the load stop member abuts the piston to thereby arrest movement of the tensioner arm along the path in a second direction, opposite the first direction, and thus define the tensioner arm load stop position;
wherein the load stop member is moveable between a first extended position correlated to the tensioner free arm position and a second retracted position correlated to a tensioner arm position that is maximally displaced away from the tensioner free arm position, and wherein, provided the load stop member is not in the first extended position, the tensioner arm is unconstrained by the load stop member to move in the first direction towards the free arm position.

10. A tensioner as claimed in claim 9, wherein the cylinder includes an oil/air mixture therein and the piston includes orifices to enable the air/oil mixture to flow across the piston.

11. A tensioner as claimed in claim 9, wherein the piston has a hole in line with the load stop member and a plastic or elastomeric membrane covers the hole and contacts the load stop member.

12. A tensioner as claimed in claim 9, wherein in the engine accessory drive system a drive pulley and a driven pulley are capable of reversing roles such that the driven pulley becomes a drive pulley and the drive pulley becomes a driven pulley.

13. A tensioner for a vehicle engine accessory drive system having an endless drive member, at least one drive pulley disposed to drive the endless drive member, and at least one driven pulley disposed to be driven by the endless drive member and connected to drive an accessory, the tensioner comprising:
a tensioner arm mounted to the engine that is movable delimited by a free arm position and a load stop position;
a tensioner pulley rotatably mounted to the tensioner arm, the tensioner pulley configured to engage the endless drive member;
a biasing member arranged to urge the tensioner arm in a first direction towards the free arm position; and
an adjustable load stop mechanism including a moveable load stop member, a drive mechanism for moving the load stop member and a control system connected to the drive mechanism,
wherein the load stop member is positionable in a range of positions to limit movement of the tensioner arm in a second direction, opposite the first direction, to thereby define the load stop position,
wherein the load stop member is moveable between a first position and a second position, and wherein, in at least some positions, the tensioner arm is unconstrained by the load stop member to move in the first direction toward the free arm position,
wherein the drive mechanism includes a motor for moving the load stop member to vary the location of the tensioner arm load stop position, the drive mechanism being operable to move the load stop member towards the first position to actively drive the tensioner arm towards the free arm position so as to increase tension in the endless drive member, and
wherein the control system includes a current sensor for measuring current supplied to the motor and a position sensor configured for use in determining the position of the load stop member, the control system being operable to:
i) repeatedly calibrate the tensioner by moving the load stop member from the second position towards the first position and map motor current against the position of the load stop member,
ii) receive as an input a desired tension for the endless drive member, and
iii) move the adjustable load stop member to a suitable position based on the calibration map.

* * * * *